Nov. 30, 1965  C. L. CUMMINS  3,220,392
VEHICLE ENGINE BRAKING AND FUEL CONTROL SYSTEM
Filed June 4, 1962  10 Sheets-Sheet 1

INVENTOR
CLESSIE L. CUMMINS

ATTORNEY

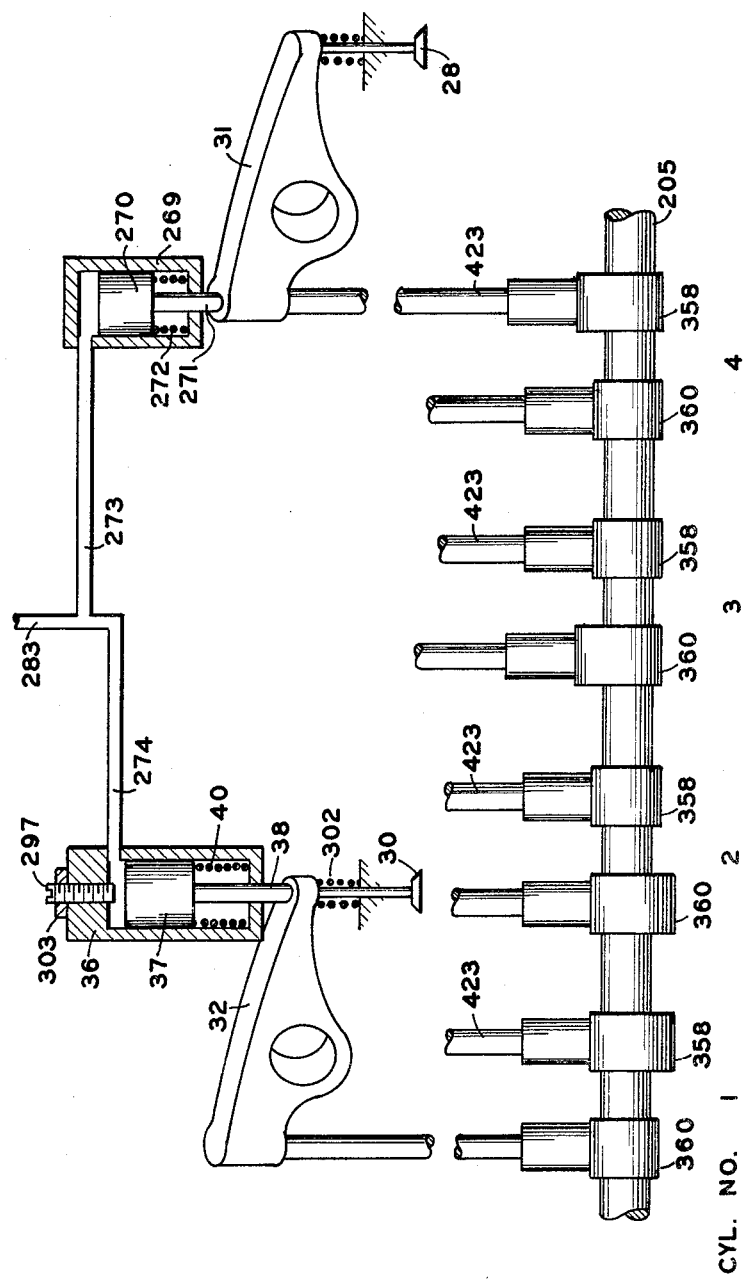

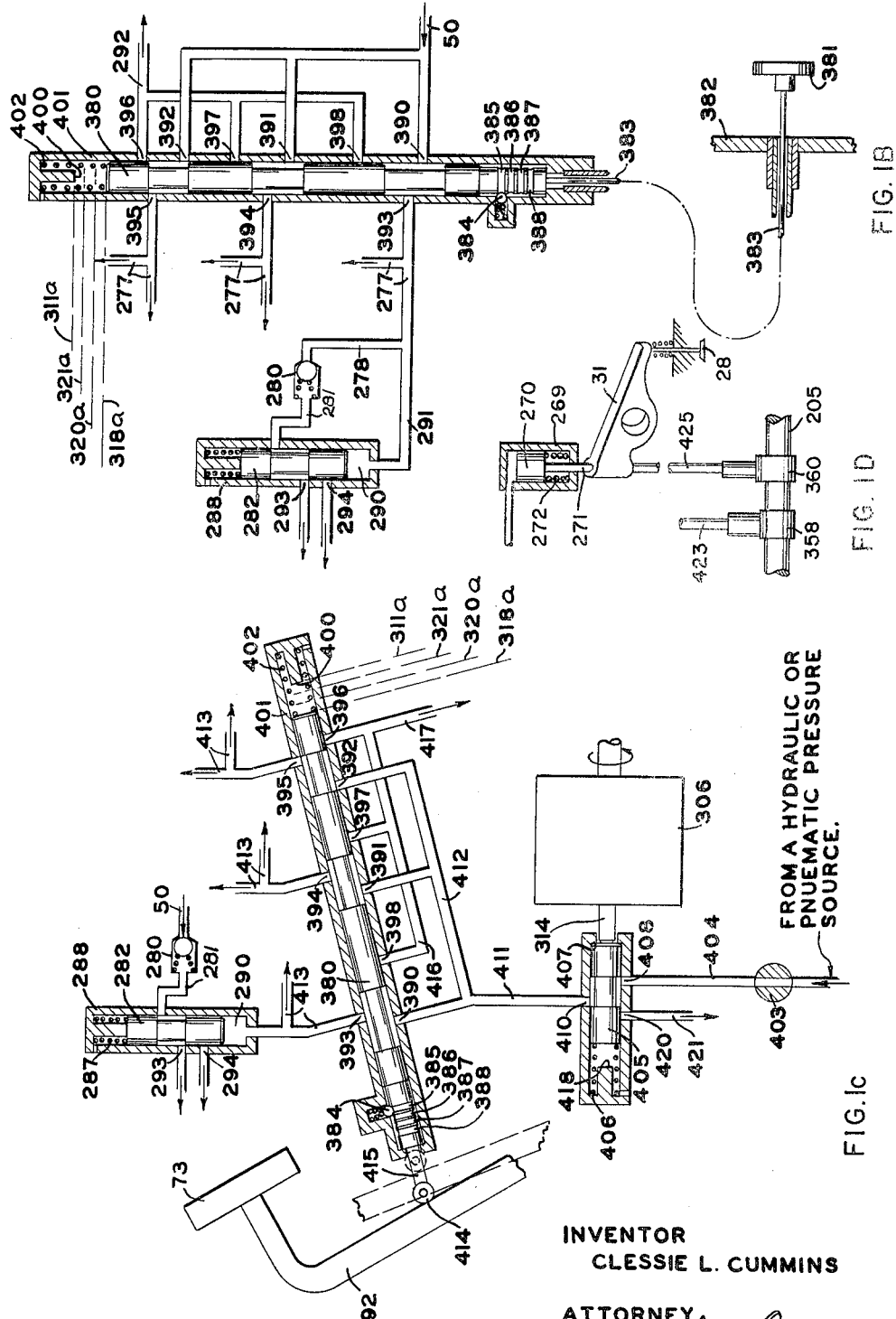

Nov. 30, 1965     C. L. CUMMINS     3,220,392
VEHICLE ENGINE BRAKING AND FUEL CONTROL SYSTEM
Filed June 4, 1962     10 Sheets-Sheet 4
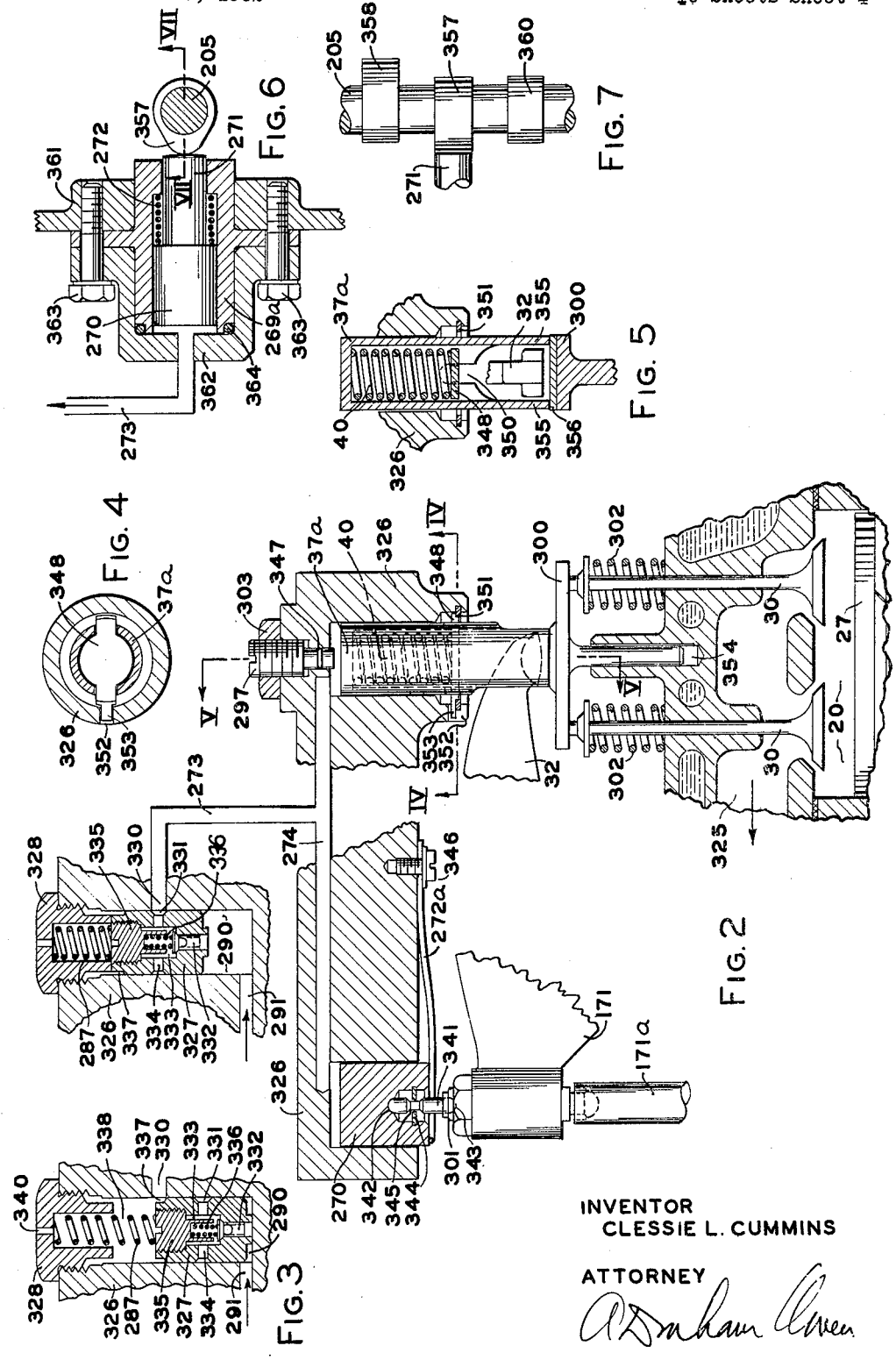
INVENTOR
CLESSIE L. CUMMINS
ATTORNEY

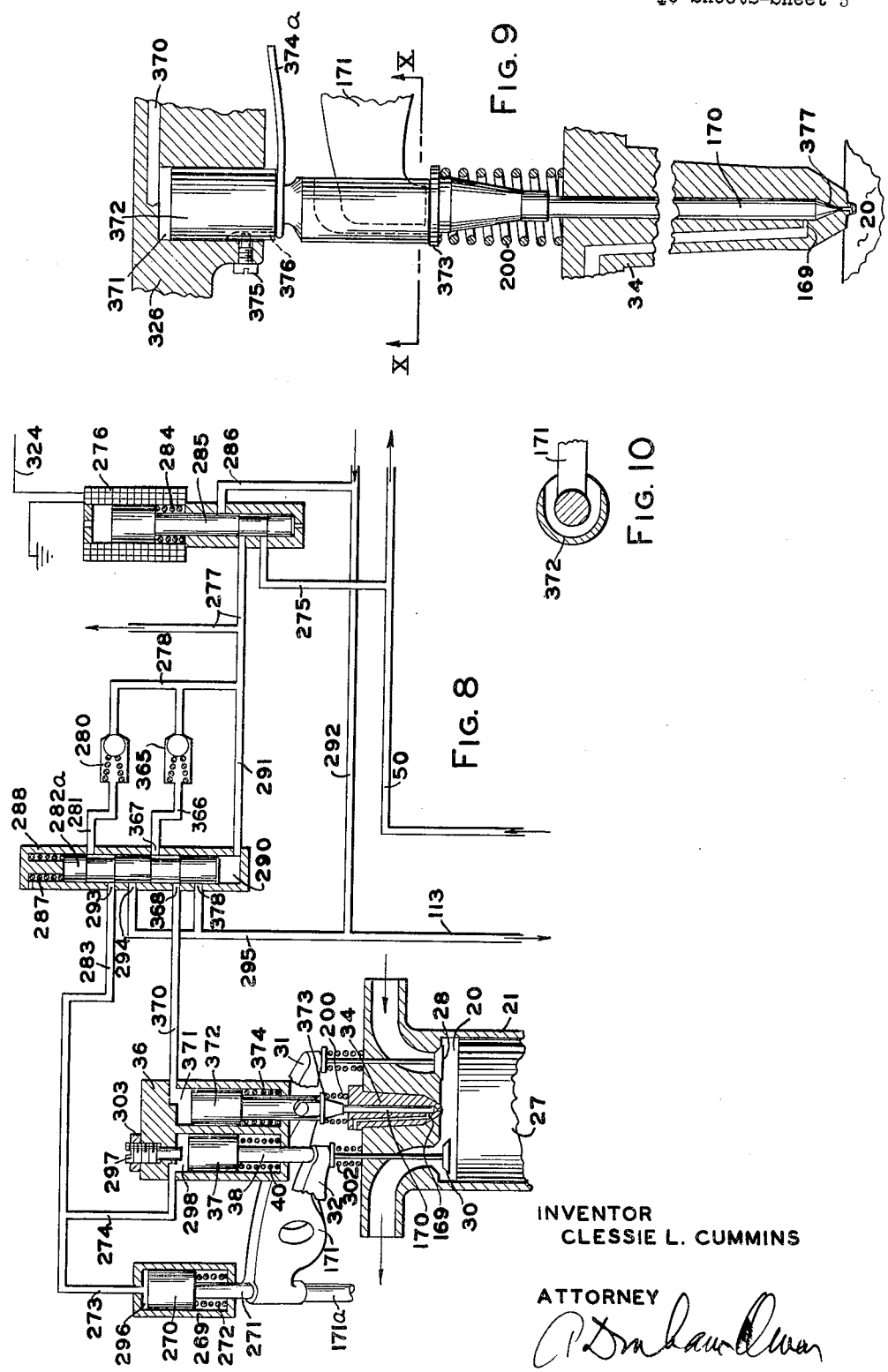

Nov. 30, 1965  C. L. CUMMINS  3,220,392
VEHICLE ENGINE BRAKING AND FUEL CONTROL SYSTEM
Filed June 4, 1962  10 Sheets-Sheet 6
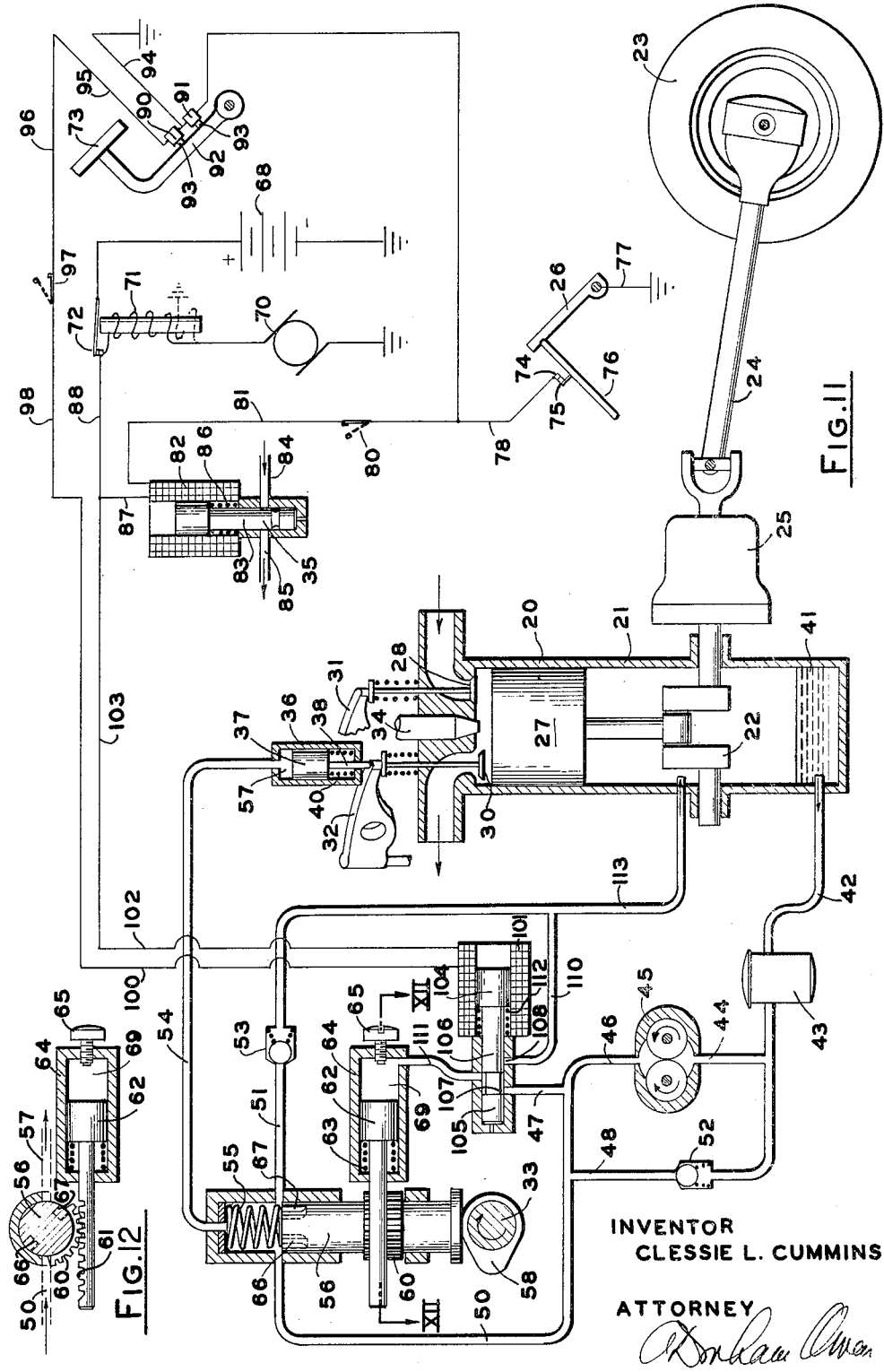
INVENTOR
CLESSIE L. CUMMINS
ATTORNEY Nov. 30, 1965     C. L. CUMMINS     3,220,392

VEHICLE ENGINE BRAKING AND FUEL CONTROL SYSTEM

Filed June 4, 1962     10 Sheets-Sheet 7

INVENTOR
CLESSIE L. CUMMINS

ATTORNEY

Nov. 30, 1965  C. L. CUMMINS  3,220,392
VEHICLE ENGINE BRAKING AND FUEL CONTROL SYSTEM
Filed June 4, 1962  10 Sheets-Sheet 8
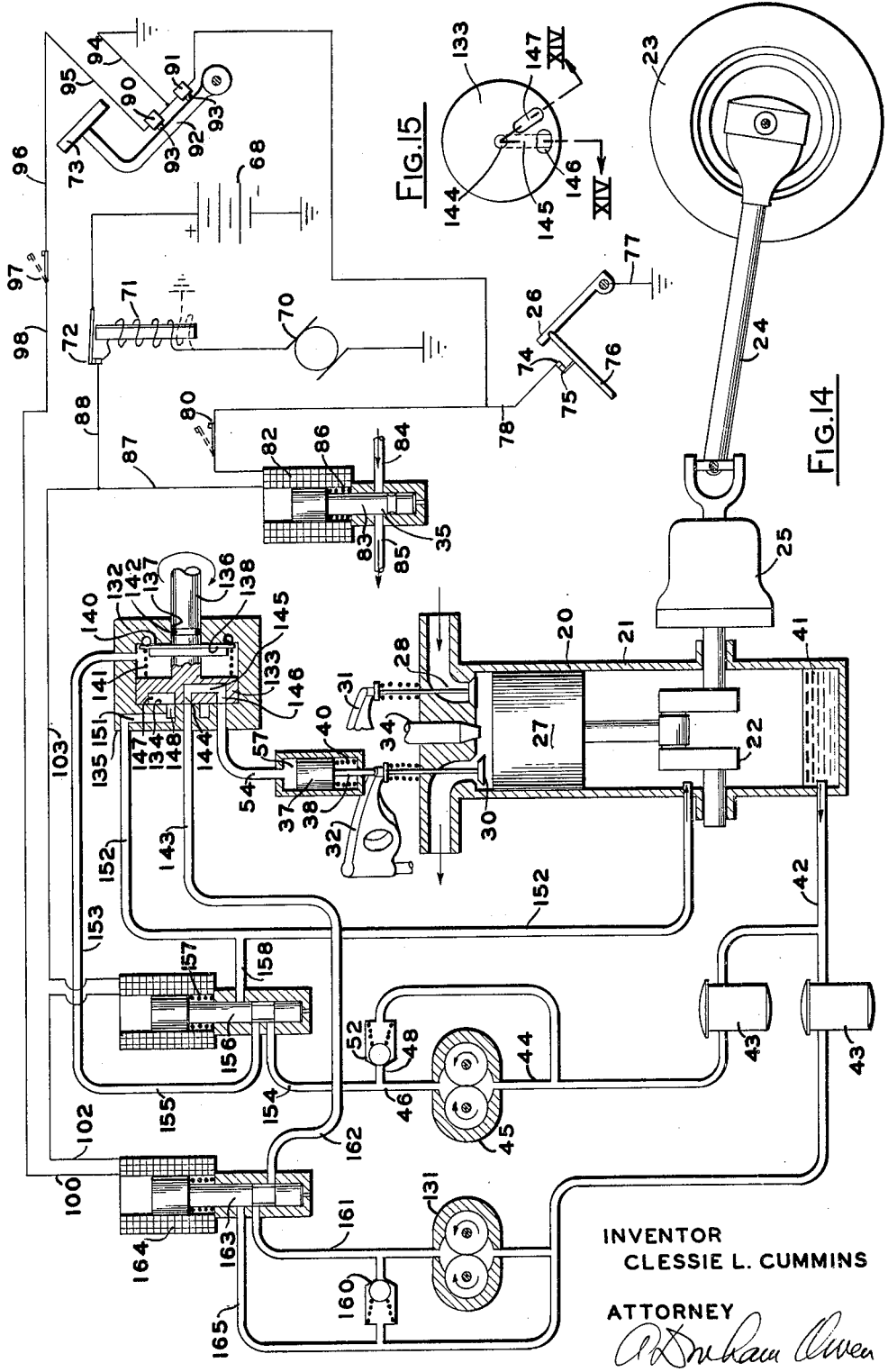
INVENTOR
CLESSIE L. CUMMINS
ATTORNEY

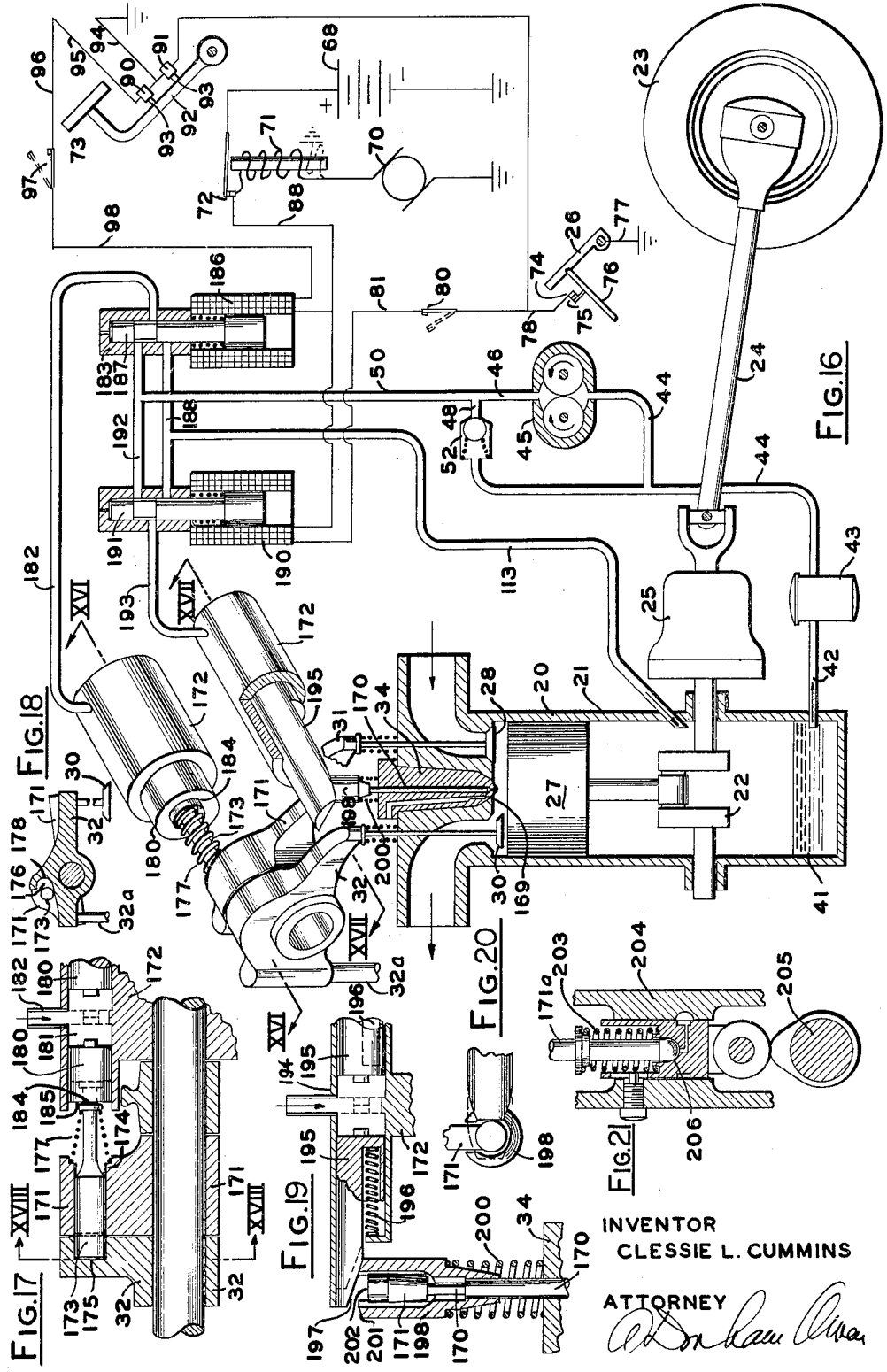

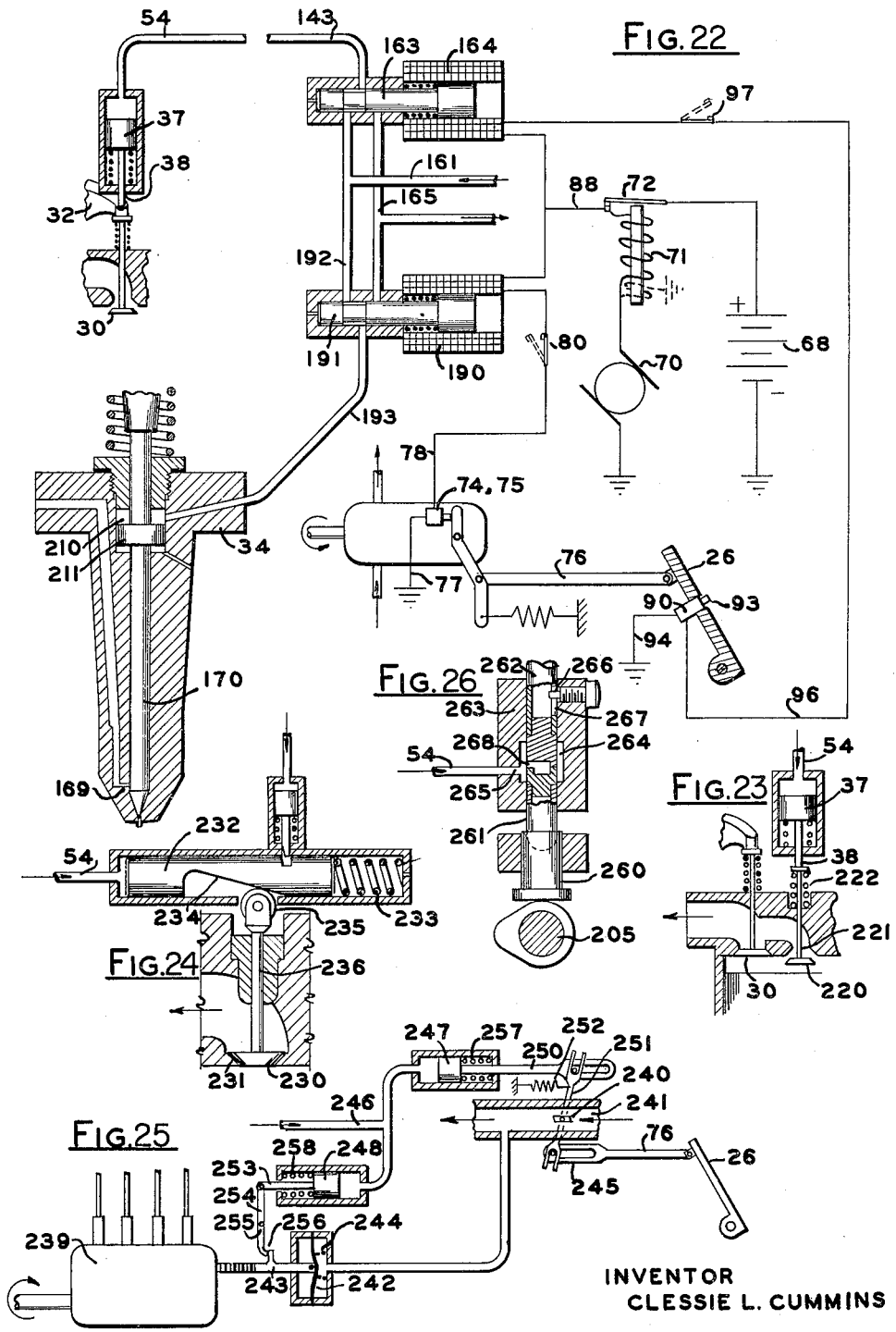

United States Patent Office 3,220,392
Patented Nov. 30, 1965

3,220,392
VEHICLE ENGINE BRAKING AND FUEL CONTROL SYSTEM
Clessie L. Cummins, 80 Cloudview Road, Sausalito, Calif.
Filed June 4, 1962, Ser. No. 203,681
44 Claims. (Cl. 123—97)

The present application is a continuation-in-part of my application Serial No. 808,847 filed April 24, 1959, which was a continuation-in-part of my application Serial No. 662,494 filed May 29, 1957, now abandoned.

This invention relates to improvements in braking mechanisms for vehicles propelled by internal combustion engines.

Certain features of the invention are applicable to all forms of reciprocating internal combustion engines, whereas other features are applicable to specific forms of such engines.

A braking effect can be obtained on a compression ignition engine as well as on a spark ignition engine, by converting the engine into an air compressor; i.e., by opening a valve to the atmosphere near the end of the compression stroke and closing it shortly afterwards.

To obtain the maximum braking effect in the foregoing system, the flow of fuel to the engine should also be cut off. On the Cummins-type compression ignition engine using the PT fuel system in which the fuel normally acts as the plunger lubricant and must be present at all times in the plunger and injector housing, I provide means for seating the plunger whenever the engine is converted to a power absorber, thus holding the fuel supply in *status quo* with many attendant advantages. I also provide an alternative means whereby the plunger is seated any time the throttle is closed and the engine is being rotated above idling speed; in other words, in coasting with the throttle closed, holding down the plunger will prevent the pressure in the cylinder from forcing the fuel into the return line and not being present when power is again required. Since filing the parent application, Serial No. 662,494, now abandoned, I have developed for use in the Cummins-type engine a new fuel system. This is described in my Patent No. 2,997,993. It eliminates any problems resulting from the complete shut-off of metered fuel to the injector without the necessity of holding the plunger seated when coasting.

The broad, overall purpose of my present invention remains the same, namely: to provide auxiliary braking power for vehicles propelled by either compression ignition or spark ignition internal combustion engines.

Heretofore, many problems have arisen in connection with the braking of vehicles propelled by engines of the types above described. This has been particularly true in the compression ignition type engine where full reliance had to be placed on the wheel brakes, since the engine itself, when rotated through the drive shaft by the inertia and mass of the forward moving vehicle, offered mainly only the resistance due to the friction losses of the engine. In some engines even this friction effect was offset by the power derived from the burning of the fuel being fed to the engine by leaking or poorly adjusted pumps or governors. Thus, the meager auxiliary braking from the friction losses had placed these vehicles almost completely at the mercy of the wheel brakes.

Today, as for many years past, failure of the brakes accounts for the frequent accidents caused by runaway trucks, busses and truck-trailer combinations on hills or in traffic. Each such accident probably could have been avoided if the vehicle had been in one of its lower gear ratios and had had means to convert its engine into an air compressor so it could have served as an auxiliary brake.

The added burden on the wheel brakes of having to do the whole job of arresting the forward movement of the vehicle has meant that replacement of the brake shoes or lining has had to be done frequently. In spite of the heavy cost of brake relining and the tie-up of the vehicle while this was being done, no satisfactory solution to the problem has been worked out heretofore. Also, the rapid wear of the brake lining places such a vehicle in a vulnerable state at frequent periods as the operator seeks economy by stretching out the interval between brake relining jobs.

The problem of getting no material braking assistance from the engine is even more noticeable today, with the tremendous growth in use of large truck-trailer units and of busses operating on the highways at speeds as high as 60 to 70 miles an hour, and sandwiched in with hundreds of passenger cars and other trucks, requiring the driver to decelerate frequently and to make frequent application of the wheel brakes to avoid collisions.

An example of the practical problems that have been faced for years by the drivers of such vehicles is this: On a long downgrade, such as the Donner Pass Road or the Grapevine Road in California, with a vehicle powered with a diesel engine, for example, two problems in braking are ever present in the driver's mind. One problem is to use the brakes as little as possible on these long descents, to prevent their over-heating. The driver knows that over-heating may result in a complete loss of brakes, and that this will leave the vehicle with no other means of effectively checking its speed, so it will run wild on the highway and end up in an accident. Speeds of 100 to 105 miles an hour have been clocked for these runaway trucks. This threat leads the driver to try to save his brakes by what is called "pumping" the brakes. It means applying the wheel brakes for short periods to check the vehicle's speed and allowing intervals in between applications for the brake drums and shoes to cool. Pumping the brakes creates the second problem, because the driver, in his frequent application of the brakes, may use up the available air supply faster than the compressor replenishes it. This exhaustion of the air supply before reaching the bottom of the grade also leaves the vehicle without any effective brakes. The hand or parking brakes are not adequate for such services, and there is no mechanical linkage on these large vehicles by which the brakes can be applied when the air supply is exhausted or lost and the air brakes cease to function. An instance typical of this type of brake failure occurred on October 19, 1955, when a heavily loaded truck-trailer ran down a hill into the town of Cumberland, Maryland, killing five people. The driver said afterward that he took to the center of the road and gunned his engine in the hope of raising some air pressure in the brake system. The report on the accident said: "Meyers estimated he was doing 80 or 90 miles an hour when he roared through Frostburg, 11 miles west of Cumberland. Many trucks have gotten loose on the steep grade and drivers usually ditched them around Eckhardt Mines."

Rupture of the air line or failure of the air compressor is also a frequent cause of brake failure on such vehicles. This type of failure led to a fatal truck runaway on a San Francisco hill in 1955, with several people killed and many cars smashed as the truck careened down the street.

The driver knows, too, that overheating of the vehicle's brakes may result in a fire which not infrequently spreads to the vehicle's contents, and if the contents are something highly inflammable or explosive, the danger extends not only to himself but to others on the highway, and to property adjacent the highway. Also, because the brake drum and tire rim are attached, overheating of the brakes heats up the tires and shortens their life and sometimes causes blowouts.

It is, therefore, the broad object of my invention to solve the foregoing problems, as well as others not yet mentioned. I have done this by providing means for converting the engine into an air compressor so that it provides a powerful braking unit.

The preferable controls by which this conversion is effected may be by switches mounted on the accelerator pedal, on the clutch pedal, on the brake, or on the instrument panel of the vehicle, or by any combination of these. The conversion of the engine into a compressor preferably should occur the instant the driver removes the foot from the accelerator pedal, and in one form this may be effected by having a spring pressed switch lever that closes the control circuit upon removal of the foot from the pedal. The return of the engine to its normal operation should be effected before its r.p.m. is too slow to keep the engine rotating, and this can be effected by having a spring-pressed switch lever on the clutch pedal, which when pressed, will open the control circuit. Another form is to have a switch on the instrument panel which the driver uses to close the control circuit and later to open the control circuit when any desired deceleration has been accomplished. Another form is to have a switch on the brake pedal which the driver's foot engages and can depress without actually applying the brake. When depressed, the switch closes the control circuit to convert the engine into a brake. The circuit is broken when the driver's foot is applied to the switch carried on the clutch pedal or by removing the foot from the brake pedal. Another form of control is automatic and involves the use of a speed-responsive switch linked to a switch either on the instrument panel, on the brake pedal, on the clutch pedal or on the accelerator pedal. The speed-responsive switch closes the control circuit when the engine r.p.m. is above idling speed. It is in this range of engine r.p.m. that conversion of the engine into a braking force is desired. It is effected when the operator by hand or by foot closes the control circuit by moving one of the switch levers mentioned. This latter form of control provides the conversion during that period of the braking cycle from the instant the driver wishes to decelerate the vehicle down to the time when the vehicle has been slowed to just above the normal idling speed of the engine. When the latter speed is reached, this form of my device automatically restores the engine to its normal operating condiion. Thus, in this critical speed range, where most of the difficult braking conditions are encountered, this form of my invention provides the driver with practically automatic supplementary auxiliary braking capacity.

The net result is that the driver is able to accomplish with the engine much of the braking needed in driving, and the wheel brakes are used less frequently and not for such long periods as to burn out or to exhaust the air supply because the driver was pumping the brakes.

This is shown in a test of a vehicle equipped with my invention, applied to a Model J Cummins Diesel Engine equipped with a PT system. The test vehicle weighed approximately 5500 pounds and had a four-speed transmission. It was placed in second gear and started down a hill with approximately a 35 percent grade. The test run was about 200 yards down the hill. The truck went over the brink with the engine doing about 2000 r.p.m. No foot braking was done, nor was either stage of my invention set in operation. The engine did not hold back the vehicle and it reached a dangerous speed which required application of the wheel brakes when the engine exceeded 2600 r.p.m.

The test was then repeated on the same hill and for the same distance, with the fuel shut off by seating the plungers. The truck went over the brink at 2000 r.p.m. and the engine held back the vehicle, never reaching the governed speed of the engine.

The third test was made on the same hill and for the same distance, with both the fuel shut off by seating the plungers and the engine converted into a compressor, as provided in my invention. The truck was started over the brink at 2300 r.p.m. and before going the 200 yards it was slowed down to the idling speed of the engine. On this test the driving wheels could be heard breaking traction in going over slight bumps in the pavement, which indicated the holding power transmitted through the drive wheels to the engine.

In addition to the foregoing, there are other significant and important benefits which flow from the use of my invention in the operation of vehicles powered by these internal combustion engines. I shall name some of these benefits and then refer to each in turn. They are: (a) elimination of air pollution when coasting, (b) added fuel economy, (c) less frequent oil changes in some types due to less dilution by the fuel, (d) less frequent engine overhaul, (e) aid in shifting gears in the transmission, (f) a form of "dead man" control, and (g) less driver fatigue.

An important benefit of the new combination is the automatic fuel shut-off when braking or when coasting. The air pollution problem in many congested urban areas yet remains to be solved. It has long been recognized that one of the important factors contributing to air pollution is the gases passed into the atmosphere from internal combustion engines. The gases in the exhaust products are most harmful when the engine is under coasting conditions It is, therefore, an object of my invention to provide an automatic shut-off so that fuel is not admitted to the engine cylinders when braking, or alternatively when coasting whether on hills or between stops on the level in towns.

Also a very important benefit of the new combination by which I effect my invention is the matter of added fuel economy. The competitive situation is such in the trucking industry today that a saving in fuel cost of only a fraction of a cent per mile can mean the difference between profit or loss to the operator. It is therefore an object of one form of my present invention to provide means for shutting off the fuel to the engine whenever the foot throttle is released or the driver goes farther and actuates the control for converting the engine into an air compressor.

Another benefit of my new combination is the aid it gives the driver in shifting gears. Here, the important consideration is in accomplishing the shift to a higher gear in as short a time interval as possible. This becomes especially important with a heavily loaded vehicle while ascending any grade where the rise is substantially continuous. In climbing, the engine must be kept revolving in the speed range which allows it to deliver its maximum torque. The driver's aim is always to shift into as high a gear as possible, but the problem comes each time the driver attempts a shift to a higher gear.

The heavy multi-ratio transmissions in trucks do not usually have synchro-mesh. So to accomplish a shift of gears it is necessary, at the instant of the shift, that both the driving and the driven gears in the transmission shall be rotating at like speeds. Suppose the driver starts the truck in the proper low gear and speeds the engine up to its top governed speed of, say, 2500 r.p.m., which could bring the truck up to about 4 miles an hour. The clutch then is disengaged and the throttle is closed. The driver must wait for the engine, with its heavy fly-wheel and the driving gear in the transmission, to slow down from 2500 r.p.m. to meshing speed with the driven gear in the transmission, which is being rotated at vehicle speed. Two things are occurring while the clutch is disengaged. The vehicle, being on an ascending grade, is losing speed, so the driven gear in the transmission is slowing down. The engine, having its throttle closed, is slowing down. The difficulty comes because the engine does not slow down fast enough and the driver finds that, by the time the engine is slowed down to meshing speed of the transmission, the vehicle has slowed down too much and, if the clutch were engaged, would impose a heavier load on the engine than the engine could pull at such a low r.p.m. It is not uncommon for drivers to try over a considerable distance to get into the next higher gear. The trouble is that the engine coasts for seconds longer than it should and some of the forward momentum of the vehicle is lost by the time the gears can be meshed. My invention solves this problem by providing means to convert the engine into an air compressor, as previously described, and this has the effect of quickly reducing the r.p.m. of the engine. The shift of the transmission to the next higher gear ratio then is made seconds earlier than has been possible heretofore, and is made before the forward momentum of the vehicle has been lost. The net effect of my invention is to enable the driver to shift to as high a gear ratio as is possible on a particular hill, rather than for the truck to have to climb the hill in a low ratio because of inability to get into a higher ratio.

Another benefit possible with my invention, where the controls are on the foot throttle, is to provide a form of "dead man control" to the extent that, if the driver loses consciousness, is thrown out of the cab, or for any other reason removes his foot from the foot throttle with the vehicle in motion and in gear, the engine will automatically act as a braking force of considerable value, as shown by the tests recited above.

Another benefit of my invention is in the area of driver relaxation and satisfaction. The driver is able to approach his work with a greater feeling of assurance, for he knows that his vehicle has greater braking power than it had before, that in many cases he can shift its gears under conditions impossible before, and that he can drive with an economy of fuel not possible before. Many have forgotten that when the compression ignition engine was first introduced for use on trucks one of the driver's first reactions was that he missed the retarding effect he had become accustomed to, with the spark ignition engine.

Another benefit of my invention is to provide a control by which the driver, in decelerating, may select how long he will permit the vehicle's engine to rotate without acting as a brake, and to select when he will convert the engine into a major braking force. This feature of my invention is important. Many occasions arise on the highway where the driver knows a mile or two in advance that a stop will be necessary. By means I provide, the driver can elect to allow the vehicle to coast along for the first part of the deceleration with the fuel shut off, and then actuate the control by which the engine becomes a real retarding power. The driver will learn to gauge the time for using the retarding power of the engine so that, in coming to a stop, the wheel brakes will be used only at the very end, when the engine automatically converts back to normal operation and can be declutched.

In functioning as an air compressor the engine is doing work which produces heat. This suggests an important benefit of my invention, which is the feature of not allowing the engine to cool appreciably on a long downhill run. Without my invention, the engine cooling water would be cooled down in such a situation to possibly 100 degrees F., particularly in cold weather. This has an extremely detrimental effect on an engine. During the downhill run the pistons and cylinder walls will have cooled and contracted. When the engine suddenly produces power again at the bottom of the hill, the pistons will heat up much faster than the cylinder walls and thus expand more rapidly than the walls. This decreases the clearance between the pistons and their walls to a point where scuffing of the pistons and walls or even sticking of the pistons in the walls may result.

It is also a well-known fact that an engine which goes through heating and cooling cycles will never have the life of an engine which runs at a constant temperature during its operation.

Other objects and advantages of the invention, as it is applied to differently equipped engines, will occur to those skilled in this art, and some will become apparent from the following description.

In the drawings:

FIG. 1 is a diagrammatic view of a vehicle showing in cross section and partly in perspective one cylinder of a multi-cylinder four-cycle compression ignition engine of the Cummins type using a fuel injector of the type shown in my patent No. 2,997,993, and with its inlet and outlet valves and ports, with a hydraulic system utilizing the upward motion of the injector rocker arm pushrod for opening a valve to the atmosphere to release the air pressure in the cylinder when the piston is near the end of the compression stroke and closing it thereafter; and showing the control circuit for operation of the hydraulic system.

FIG. 2 is a larger and more detailed view in cross section, not to scale, of the hydraulic system for operating one cylinder of a four-cycle compression ignition engine similar to that in FIG. 1, except that there are two exhaust valves per cylinder.

FIG. 3 is a view in cross section showing the control valve of FIG. 2 in its outward position.

FIG. 4 is a view in cross section of the valve-actuating piston, taken on the line IV—IV of FIG. 2.

FIG. 5 is a view in cross section of the valve-actuating piston taken on the line V—V of FIG. 2.

FIG. 6 is a view in cross section of the piston which creates the source of pressure operating directly off an added cam on the engine camshaft.

FIG. 7 is a view taken on the line VII—VII of FIG. 6, showing the location of the extra cam lobe on the engine camshaft.

FIG. 8 is a diagrammatic view in cross section and partly in perspective of the hydraulic system of FIG. 1, plus a hydraulic method for holding seated the injector plunger of the Cummins PT type, in order to shut off the fuel when the engine is acting as a compressor.

FIG. 9 is a larger and more detailed view in cross section, showing the components necessary to hold the injector plunger seated.

FIG. 10 is a view in cross section of the hold-down piston, taken on the line X—X of FIG. 9.

FIG. 11 is a diagrammatic view of a vehicle showing in cross section and partly in perspective one cylinder of a multi-cylinder four-cycle compression ignition engine with its inlet and outlet valves and ports; with a mechanism for opening a valve to the atmosphere to release the air pressure in the cylinder when the piston is nearing the end of the compression stroke and closing it shortly afterward; with a fuel shut-off valve and showing the control circuit for the operation of the entire mechanism.

FIG. 12 is a view in cross section taken on the line XII—XII of FIG. 11.

Figure 13:
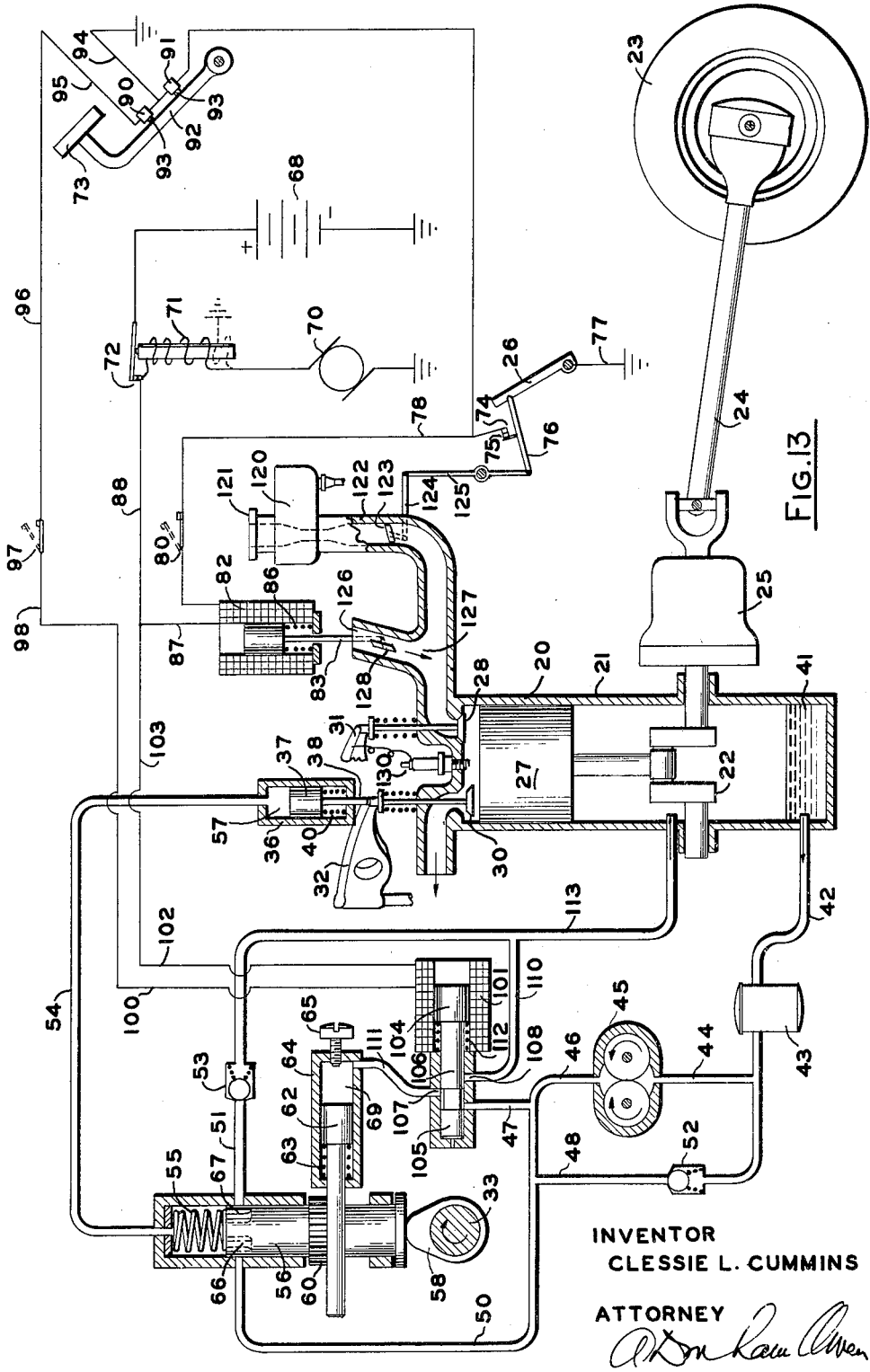

FIG. 13 is a diagrammatic view similar to FIG. 11 showing the invention adapted to a spark ignition carbureted engine.

FIG. 14 is a view like FIG. 11, showing an alternative form of mechanism for opening and closing a valve to the atmosphere, to release the air pressure in the cylinder.

FIG. 15 is an end view in elevation of the distributor rotor.

FIG. 16 is a diagrammatic view of a vehicle showing in cross section and partly in perspective the cylinder of a multi-cylinder four-cycle compression ignition engine of the Cummins type; with a mechanism for seating the injector plunger to cut off the flow of fuel; a mechanism utilizing the movement of the injector rocker lever for opening a valve to the atmosphere to release the air pressure in the cylinder when the piston is near the end of the compression stroke and closing it thereafter; and showing the control circuit for the operation of the entire mechanism.

FIG. 17 is a view in vertical cross section taken on the line XVI—XVI of FIG. 16, showing the injector rocker arm locked to the exhaust valve rocker arm.

FIG. 18 is a view in vertical cross section taken on the line XVIII—XVIII of FIG. 17, showing the exhaust valve rocker arm in section and the injector rocker arm behind it.

FIG. 19 is a view in vertical cross section taken on the line XVII—XVII of FIG. 16, showing the mechanism for seating the plunger to shut off the fuel.

FIG. 20 is a plan view of the top of the injector mechanism, showing how the rocker lever clears the plunger seating mechanism so the injector rocker lever is left free to rock when it is connected to the exhaust valve rocker.

FIG. 21 is a view in cross section through the engine camshaft and tappet, showing a method of keeping the injector pushrod seated when the injector plunger is held down, as in FIG. 9.

FIG. 22 is a diagrammatic view, partly in cross section, showing the injector and the exhaust valve of one cylinder of a multi-cylinder engine adapted to be used in an engine of the type shown in FIG. 16, and showing an alternative form of control actuation.

FIG. 23 is a diagrammatic view in cross section of the top of an engine cylinder, where instead of using an existing valve in the engine an auxiliary valve is added to permit the blow-down.

FIG. 24 is a diagrammatic view in cross section of another valve arrangement in the engine cylinder to permit the blow-down.

FIG. 25 is a diagrammatic view in cross section of portions of an engine and of the fuel feed mechanism of the Bosch type, showing a form of control for shutting off the fuel.

FIG. 26 is a diagrammatic view in cross section of portions of an engine in the region of the camshaft and exhaust valve push-rod, showing an attachment which will produce movement of the exhaust valve push-rod, independent of the movement imparted by the exhaust valve cam.

In the drawings I have illustrated typical applications of my invention to the several kinds of reciprocating internal combustion engines in general use today and I shall now described each in detail.

Broadly viewed, what my invention provides is a braking system for a wheel-driven vehicle having an internal combustion engine with a plurality of cylinders; drive wheels therefor; means connecting the engine to said wheels, including a transmission and a clutch means; braking means operative on said drive wheels and a lever for rendering said means operative; valve means in said engine cylinders; means for feeding fuel into said engine cylinders, a throttling means for controlling same, and means for shutting off the flow of fuel into said engine cylinders; means for opening the valve means in each cylinder when the piston is near the end of the compression stroke; a control means; said braking system being characterized by having a control connection between said fuel control and both said fuel shut-off means and said valve-opening means; and in which said fuel shut-off means retains a supply of fuel ready to flow immediately to the engine without any lag when opened up by the control mechanism; whereby upon actuation of said control connection said fuel shut-off means and said valve-opening means will be actuated to convert said engine into a compressor so it will exert a braking effect on said vehicle and can be immediately reconverted to operation as a power producer with no substantial lapse of time.

*Compression ignition engine—mechanical injection type—hydraulic actuation (FIG. 1)*

Figure 1:
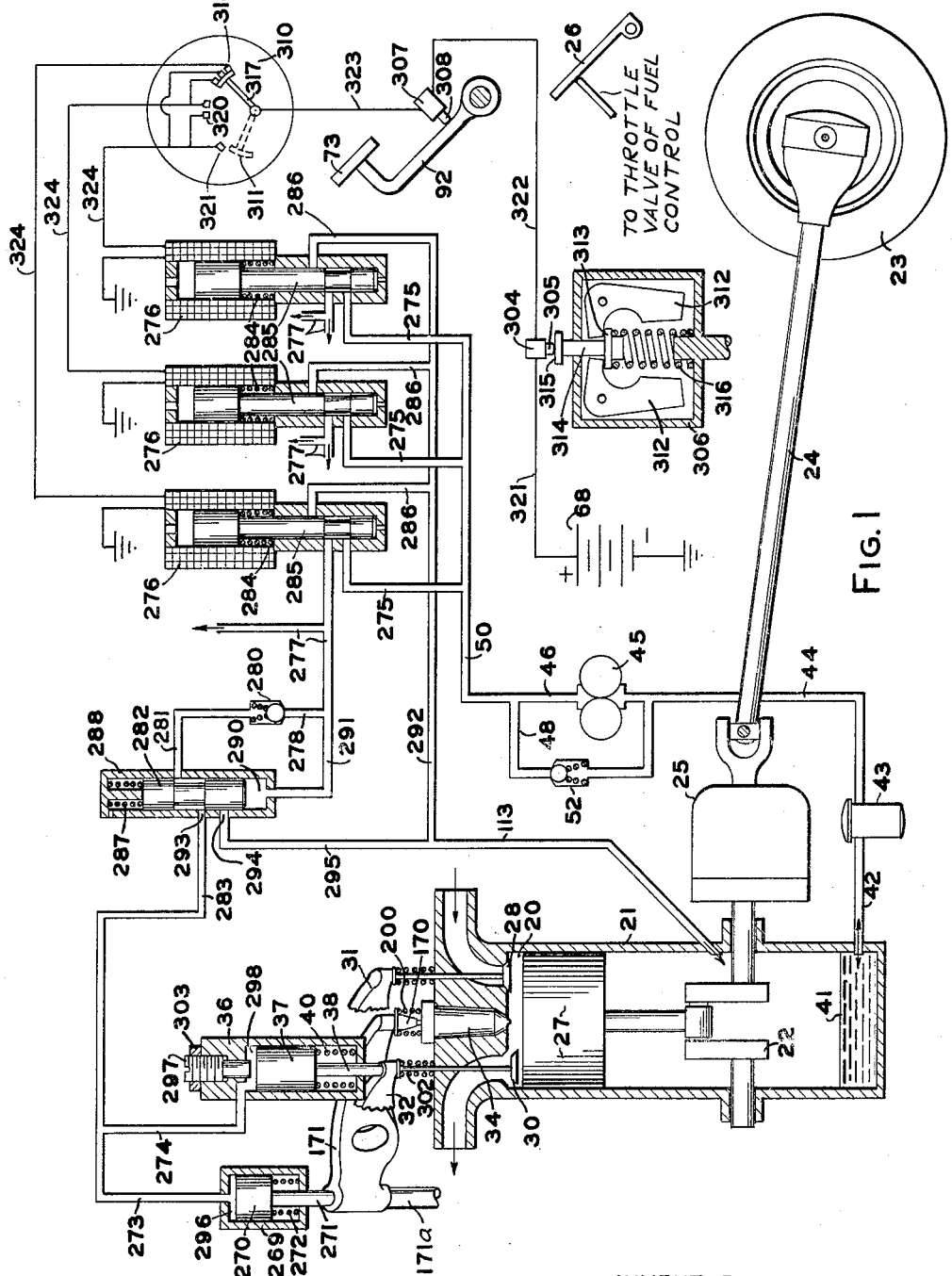
FIG. 1A is a diagrammatic view in cross section and partly in perspective of the hydraulic system of FIG. 1, altered to show the use of the cam motion of the valve actuating mechanism for one cylinder to open the exhaust valve of another cylinder.
FIG. 1B is a diagrammatic view of a non-speed-responsive, manually operated control circuit for obtaining selective application of the braking system.
FIG. 1C is a diagrammatic view of an alternative control system showing a typical arrangement where hydraulic or pneumatic control is substituted for the electric control of FIG. 1.
FIG. 1D is a fragmentary view corresponding to the right-hand portion of FIG. 1A and showing an arrangement in which the cam motion of the exhaust valve actuating mechanism for one cylinder opens the exhaust valve of another cylinder.

The several elements combined to accomplish my invention are shown diagrammatically in the preferred form in FIG. 1. One cylinder 20 of a four-cycle compression ignition engine 21 of the mechanical injection (Cummins) type with a crankshaft 22 is shown connected to the driving wheels 23 by the drive shaft 24 and the transmission and clutch 25.

Each cylinder 20 has its piston 27 and suitable valves 28 and 30, each with its respective rocker arms 31 and 32 to open the valves at the proper time, as the engine camshaft (in FIG. 1) determines.

My invention takes advantage of the fact that the fuel injector plunger 170, inside the injector body 34, is pushed inward by its rocker arm 171 when the piston 27 is nearing the end of the compression stroke. This is also the time when it is appropriate, in my novel braking system, to open the exhaust valve 30 to relieve the pressure built up on the upward stroke of the piston 27 so that it will not be present to act on the piston as it travels downward on the next stroke. While described in connection with the Cummins engine, this is not the only engine to which it applies. The General Motors diesel is another example.

Injectors of the type described in my Patent 2,997,993 are preferable when using this invention with the Cummins-type engine, as shown in FIG. 1, since it is best that the fuel to be injected into the cylinder 20 be shut off, while at the same time providing means to lubricate the injector plunger 170.

To achieve, with a minimum of parts, the actuation of the exhaust valve 30 to blow down the cylinder 20, I provide a self-adjusting and essentially self-contained hydraulic system for each engine cylinder which, when actuated by suitable control and valve means, hydraulically locks in a "one way" locking connection the injector rocker arm 171 to the exhaust valve 30. By one way is meant a locking connection which will open the exhaust valve 30 by the injector rocker actuating means whenever the latter moves to seat the injector plunger, but will permit the exhaust rocker 32 to open the exhaust valve 30 independently of the injector rocker 171 on the normal exhaust cycle. The reason for having the one-way locking connection between the injector rocker 171 and the exhaust rocker 32 is because the stroke necessary to seat the injector plunger 170 is much shorter than the stroke needed to open the exhaust valve 30 when on the exhaust cycle; however, the stroke of the injector rocker is adequate to open the exhaust valve 30 for blow down purposes.

The hydraulic system consists of a "master" piston 270, with its plunger ram 271 and spring 272 in its housing 269 located over the injector rocker arm pushrod 171a, and a "slave" piston 37 with its plunger 38 and spring 40 in its housing 36 located over the exhaust valve 30. When the master piston is removed inward by the action of the pushrod 171a, a hydraulic force, transmitted through conduits 273, 274, forces the slave piston outward and thus opens the valve 30.

Fluid to energize the master piston 270 may be drawn from the engine lubrication oil supply in the crankcase 41, through conduit 42, filter 43, conduit 44, to the gear pump 45 which maintains it under pressure in the conduits 46, 50, 275, past the three-way solenoid valves 276, through conduits 277, 278, past the check valve 280, conduit 281, through the control valve 282, and into the "signal circuit" 273, 274 and 283, or high-pressure line, which transmits the hydraulic force created by the inward movement of the master piston 270 to the slave piston 37. A spring-loaded check or by-pass valve 52 regulates the pressure of the lube oil.

During the engine cycles when there is no high pressure in the signal circuit 273, 274, make-up oil will flow through check-valve 280 to replenish any oil lost through leakage on the high-pressure valve opening cycle. Thus the system will always be full of oil.

When it becomes desirable to convert the engine back to a power producer, the circuit to the solenoid valve or valves 276 is broken, spring 284 retracts the valve-plunger 285, thus lining up the conduit 277 with the bleed-conduit 286. Spring 287 in the housing 288 exerts a force on the control valve 282 which causes the oil in the chamber 290 to be drained out through the conduits 291, 277, solenoid valve-plunger 285, and back to the crankcase 41 through conduits 286, 292 and 113. When the control valve 282 has been pushed to the end of the chamber 290 by the spring 287, the ports 293 and 294 in the control-valve housing 288 are indexed to line up the conduits 273, 274 and 283 with the bleed-conduits 295 and 113. The spring 40 can then force the slave piston 37 inward against the adjusting screw 297 (unless it happens to be there at that time), and retract the plunger 38 away from the exhaust rocker 32 by expelling the oil in chamber 298 back through the control valve 282 and various bleed conduits to the crankcase 41. In a similar manner, the spring 272 can then force the master piston 270 inward by displacing the oil in the chamber 296 and expelling it back to the crankcase 41. Plunger 38 also is thus retracted away from the rocker arm 32 or, as shown in FIG. 2 the valve crosshead 300, so that the entire hydraulic valve-opening mechanism required to turn the engine into a compressor is lifted out of the way when it is desired to have the engine run again as a power producer or when the speed of the engine drops below a predetermined minimum.

The spring 272 which acts against the master piston 270 is a relatively weak spring, in that it never can be stiff enough to prevent the force created by oil pressure from the pump 45 of a normally well-maintained engine from pushing the piston 270 and plunger 271 against the rocker arm 171 or injector rocker arm adjusting screw (as shown in FIG. 2) 301, when the electrical control circuit is energized to permit oil under engine lube-oil pressure into the signal circuit 273, 274 through check-valve 280 and control-valve 282.

As opposed to this, the spring 40 under the slave piston 37 must never be weak enough to allow lube-oil pressure created by the pump 45 to force outward the piston 37 and plunger 38 when the electrical control circuit is energized. If the engine-oil pressure is high enough to compress the spring 40, the slave piston will hold the plunger 38 against the rocker arm 32 or crosshead 300 during all cycles when the engine is acting as a compressor. Thus on the exhaust cycle, when the exhaust cam should normally move the exhaust rocker 32 or crosshead 300 away from the plunger 38, the plunger will now follow the inward movement of the rocker arm 32 or crosshead 300, allowing more oil to enter the signal circuit, and when the valve-spring 302 attempts to reseat the valve 30 at the end of the normal exhaust cycle it will be unable to do so because the plunger 38 and piston 37 have become hydraulically locked in the outward position, due to the check-valve 280 preventing the excess oil in the signal circuit 273, 274 from being expelled. As a consequence, the exhaust valve cannot close and the engine ceases to function as a compressor. Also, when the master piston 270 starts inward each time with more excess oil in the chamber 298, the slave piston 37 will be pumped out to a point where the mechanism could be damaged.

When installing my hydraulic system on an engine of the type shown in FIG. 1, the adjusting screw 297 locates the retracted position of the slave piston 37 so that, when the exhaust valve 30 is seated against the top of the cylinder 20, there will be a small clearance between the plunger 38 and the rocker arm 32 or crosshead 300 (FIG. 2). This clearance can be likened to the valve tappet clearance found on all internal combustion engines with mechanical valve lifters. When the screw 297 is adjusted properly, the locking nut 303 locks it securely in place. The hole occupied by the adjusting screw 297 makes an ideal port in which to bleed the air out of the hydraulic system when initially charging it with oil after installation. Oil forced through the system under engine lube-oil pressure will very rapidly purge air from the system through the screw holes.

The best way to describe the electrical control circuit would be to follow through the sequence of operations necessary to make the hydraulic engine braking system previously described operative.

The basic components of the electrical control circuit for the FIG. 1 device consist of a source of energy, the battery 68, the switch 304 with its actuating plunger 305, operated by a speed-responsive means, shown as the mechanical governor 306, the switch 307 with its actuating plunger 308, operated by movement of the vehicle brake-pedal 92, the selector switch 310, with the "off" position 311 shown dotted, which can select one or more engine cylinders 20 or pairs of cylinders, as shown in FIG. 1 to be operated as a compressor, and lastly one or more 3-way solenoid valves 276 (shown in the "on" position).

Before the engine can be turned into an air compressor by the device shown in FIG. 1, the engine speed must be above a predetermined minimum r.p.m. Below this minimum speed the action of the governor 306 prevents the actuating plunger 305 in the switch 304 from closing contacts. When the engine speed reaches this predetermined minimum, the centrifugal governor-weights 312 in the governor-housing 306 now have enough power to move outward and move the collar 313, shaft 314, and contact-seat 315 inward against the resistance of the spring 316. The inward movement of the contact-seat 315 permits the actuating plunger 305 in the switch 304 to move out and close contacts in the switch 304. The electrical circuit is now ready to be controlled by the action of the driver of the vehicle.

Where no speed responsive means is desired, the switch 304 and its ancillary parts can be omitted. The driver then controls whether the engine is to function as a compressor by operating the selector switch 310 and the foot switch 307.

When the driver desires to convert the engine into a compressor for braking purposes, he first decides how much braking force he can use from the engine to suit road conditions. This is controlled by the selector-switch 310, conveniently located on the instrument panel (not shown) of the truck. He would most likely do this at the start of a day's run, or when anticipating a change in road conditions, in order that he would not have to make his selection every time just prior to turning the engine into a compressor. Normally the entire engine would be wanted for braking purposes and the selector arm 317 would be in the position shown at 318. However, the situation might arise when, because of unusual loading of the vehicle or of slippery road conditions, the braking action of the entire engine, acting on the driving wheels only, may be too severe. In these situations the selector arm 317 could be moved to one of the other positions 320 or 321 and provide a braking effort which could cause no possible trouble. It may even be found, through long field experience, that it is not at all necessary to have this type of selector switch, but merely use an "off-on" switch which controls one solenoid valve for all engine cylinders.

Assuming that the engine speed is above the predetermined minimum and that the switch arm 317 is on the chosen contact, the only action necessary to complete the circuit is for the driver to move the brake pedal 73 enough to allow the switch-actuating plunger 308 to travel sufficiently to close contacts in switch 307. The movement of the pedal 73 need not be enough to apply the vehicle's wheel brakes. Now the circuit is completed from ground, through battery 68, leads 321 and 322, switches 304, 307, and 310, leads 323 and 324, and solenoid valves 276, back to ground. Energizing the solenoid 276 causes the plunger 285 to move downward and align the supply-conduit 275 with the conduits 277 ad 278 leading to the check-valves 280 and control-valves 282, to enable the hydraulic circuit to be put in operation.

The hydraulic engine braking system will be come inoperative when either the brake-pedal 92 is retracted, breaking contacts in the switch 307, or (provided the speed responsive switch 304 is used) when the engine speed falls below the predetermined minimum r.p.m. and the governor 306 causes the contacts in switch 304 to be broken to prevent the engine from stalling, as when coming to a stop at a traffic signal.

In connection with FIG. 1, reference was made to the control 310 by which the driver can get a selective degree of compression braking, converting two, four, or six of the cylinders into compressors. In FIG. 1 this is controlled by the selective-switch 310 and by separating the control for each pair of engine cylinders into groups fewer than all. There I use the control-valves 276 to control the cylinders in pairs. It is obvious that such control could be arranged so the cylinders would be converted in threes, or even singly. It is important to be able to convert fewer than all of the cylinders because, under many driving conditions, a gradual or only partial application of braking pressure is essential. Thus, with my device, this is achieved by the selective controls described. Many forms of such selective controls are possible, and I have illustrated these in FIGS. 1, 1B, and 1C.

*FIG. 1A—Hydraulic operation of valve from cam means for another cylinder*

In FIGS. 1, 2, 8 and 16, the injection cam (not shown) operating through the pushrod 171a and injector rocker 171 is used to provide the timed force to open the exhaust valve 30 near the end of the compression stroke of the piston 27. However, as shown in FIG. 1A, other existing cams on the main engine camshaft 205 may likewise be used to effect the exhaust valve opening at the desired time. In FIG. 1A, I show a four cylinder, four cycle engine, gas or diesel, with a firing order of 1-2-4-3. With an engine of this type and firing order, the intake valve 28 of number 4 cylinder will start to open shortly before the piston in number 1 cylinder reaches top dead center of the compression stroke. (Because of the normal overlap of the intake and exhaust valves, the intake valve always opens before top dead center at the end of the exhaust stroke.) Therefore, the motion of the intake cam 358 of cylinder number 4 can be transferred to open the exhaust valve 30 of cylinder number 1 through the intake pushrod 423, rocker arm 31 and the previously described hydraulic circuit of master piston 270, conduits 273, 274 and the slave piston 37. In turn, the number 3 intake cam opens the number 2 exhaust valve, the number 1 intake cam opens the number 4 valve and lastly the number 2 intake cam opens the number 3 exhaust valve.

While FIG. 1A and its explanation refer to a four cycle, four cylinder engine, the use of existing cams other than the injection cams on the main engine camshaft may also be adapted to engines with any number of cylinders, either two cycle or four cycle. Also, while the above explanation has referred to inlet cams, my invention contemplates the use of exhaust cams of another cylinder for the same purpose. This alternative form of the invention is shown in FIG. 1D where the exhaust cam 360 that operates a valve push rod 425 for another cylinder is used in place of the intake cam 358 for actuation of the exhaust valve according to this invention. This gives a wide choice of timing to achieve the optimum results.

*FIG. 1B—Mechanical control—non-speed responsive*

In FIG. 1B, I show a mechanical method of controlling the application of the compression brake of FIG. 1. There is also no speed-responsive control with this method of operation. The driver engages and disengages the compression brake control by a hand-operated knob mounted on the instrument panel of the vehicle. Therefore, it is left up to the driver as to when the minimum engine speed for operating the engine as a compressor has been reached.

A selector-valve 380, which combines the functions of the solenoid valves 276 and selective switch 310 of FIG. 1, is positioned by the hand-operated knob 381 mounted on the panel 382. The knob 381 is connected with the selector valve 380 by a flexible control cable 383.

The selector valve 380 has four positions which are located by the spring-loaded ball 384 dropping in one of the grooves 385, 386, 387, or 388. As shown in FIG. 1B, the valve 380 has been pulled to its furthermost position and the ball 384 has dropped in the locating groove 385. This is the position whereby lube-oil under pressure from the gear pump 45 of FIG. 1 can enter through conduit 50 into all three ports 390, 391, and 392 of the valve 380. From the valve 380 lube-oil enters the conduits 277 through ports 393, 394, and 395. Each of the ports 393, 394, and 395 supplies oil for two cylinders, as in FIG. 1, and the function of the check-valve 280 and control-valve 282 is as described for FIG. 1. I call the position shown, where the ball 384 rests in the groove 385, the position 318a to correspond with position 318 of switch 310 in FIG. 1 indicating that all three pairs of engine cylinders will be acting as air compressors.

When the control knob 381 is pushed inward by the driver to allow the spring-loaded ball 384 to drop in the groove 386, port 393 is still lined up with supply-port 390, and 394 with 391, but port 392 is cut off and port 395 now indexes with the bleed-port 396. Oil can then bleed out of a pair of control-valves 282 (not shown), through the valve 380 into the bleed-conduit 292 and back to the crankcase 41 (not shown), as in FIG. 1. Now only two pairs of engine cylinders will continue to function as compressors. When the ball 384 is in groove 386, the location of the valve 380 corresponds to switch-position 320 in FIG. 1. Therefore, I call this valve position 320a.

Repeating the step again, when the ball 384 drops in groove 387 by action of the driver only port 393 is lined up with a supply-port 390, allowing only one pair of engine cylinders to act as compressors. Port 391 has been closed off and port 394 now indexes with the bleed-port 397 letting oil from two more control-valves 282 bleed back to thec crankcase 41 through conduits 292. Note that port 395 still indexes with its bleed-port 396. This position 321a of the valve 380 corresponds to position 321 of FIG. 1.

Lastly, pushing the valve 380 against the stop 400 at the end of the housing 401 closes off the last supply-port 390 and port 393 now indexes with its bleed-port 398, thus cutting out the remaining pair of cylinders from acting as compressors. In this position, ports 393, 394, and 395 are lined up with ports 398, 397, and 396, respectively. This location of the control-valve 380, with the ball 384 in the last groove 388, is position 311a, corresponding to the off position 311 of the switch 310 in FIG. 1.

Spring 402, acting against the end of the valve-body 380, serves mainly to keep a slight pressure on the ball 384 resting in one of the positioning grooves. All movement, both in and out, of the valve body 380 is dependent on the driver pulling or pushing the knob 381.

FIG. 1C—Hydraulic or Pneumatic control—Speed-responsive

In FIG. 1C, I show a control system which substitutes a pneumatic or hydraulic circuit for the electric circuit of FIG. 1. The circuit of FIG. 1C is speed responsive and becomes inoperative when the engine speed drops below a predetermined minimum r.p.m.

The other principal difference in the circuitry of FIG. 1C is the force which moves the control-valve 282 into its operating position (port 293 indexed with conduit 281) is not necessarily created by the same source of fluid pressure that forces oil into the master cylinder 296 and slave cylinder 298 (FIG. 1).

Either oil or air from a pressure source (not shown) passes through a shut-off valve 403 and into the conduit 404 to the valve 405. If the speed of the engine is above the predetermined minimum, the governor 306 has sufficient power to move the shaft 314 inward and allow spring 406 to push the valve 405 against the stop 407, lining up port 408 with port 410. The control pressure can now enter conduits 411 and 412 and reach the supply-ports 390, 391, and 392 in the selector-valve body 401. Although the fluid passing through the muti-position valve in FIG. 1C is different from that of FIG. 1B, the operation and construction of the valves themselves are identical and therefore I am using the same numbers.

As drawn in FIG. 1C, like FIG. 1B, the valve body 380 is positioned so that ports 393, 394, and 395 are indexed with ports 390, 391, and 392 respectively. Thus, the hydraulic or pnuematic source of pressure can pass around the grooves in the valve body 380 and into conduits 413 and chambers 290 to force upward the control-valves 282 to place the engine braking system of FIG. 1 in operation.

The position shown, with the spring-loaded ball 384 in the groove 385, likewise corresponds with the position 318 of the electric switch 310 in FIG. 1. This, again, I call position 318a. Similarly, position 320a with 320, when the ball 384 is in the groove 386, 321a with 321, and the off position 311a with 311.

Actuation of the valve 380 is accomplished by the movement of the brake-lever 92. A contact roller 414 connected to the valve 380 by the piece 415 rides on the brake-lever 92 and, as the pedal 73 is depressed by the driver, the spring 402 forces outward the body 380, allowing the ball 384 to drop into whichever groove 386, 387, or 388 is desired to provide the correct amount of engine braking.

When the entire engine has been converted into a braking force, the valve 380 is against the outer end of the housing 401. When the brake-lever 92 is depressed further, it moves away from the contact roller 414, leaving the engine acting as a compressor until the pedal is allowed to come back all the way to the dotted position of the lever 92, that being the location when the driver has his foot off the pedal 73. With the pedal all the way back, supply-ports 390, 391, and 392 are cut off and ports 393, 394, and 395 line up with their respective bleed-ports 398, 397, and 396. This now permits the valves 282, under the action of their springs 287, to force out all fluid in the chambers 290 through the bleed-ports 396, 397, and 398, into conduits 416 and 417, thus restoring the engine to normal operation.

The driver has the option of letting the pedal 73 come back far enough to only cut out one pair or two pairs of engine cylinders, rather than cut off all engine braking at once. Likewise, he can apply first one and then two pairs of cylinders acting as compressors, at a time, as he depresses the pedal 73 to begin decelerating the vehicle.

If the engine speed should drop below the predetermined minimum while the driver has any or all engine cylinders acting as compressors, the governor 306 will move the shaft 314 outward and force the valve 405 against its stop 418. The supply-port 408 is now cut off and port 410 is indexed with the bleed-port 420 and conduit 421. The force acting against the control-valves 282 in chambers 290 will now be eliminated, allowing the valves 282 to move outward and the engine can then return to its normal operation before stalling.

More detailed view of hydraulic valve opening system—FIG. 2

In FIG. 2, I show the invention as adapted and used on a compression ignition engine of the type shown in FIG. 1, employing two exhaust valves 30 opening into the manifold 325, which are opened by the downward movement of a crosshead 300, the crosshead in turn being actuated by the exhaust rocker arm 32. This type of construction is standard practice in the engine industry, when more than one intake and exhaust valve per cylinder are used.

In the appended claims, where opening of one valve is called for, this is intended to include the opening of one or more valves where an engine has dual valves like FIG. 2.

Also shown in FIG. 2 is a feature whereby the control-volve 282 and check-valve 280 of FIG. 1 are combined into one unit in the housing 326. Lube-oil under engine-oil pressure enters the chamber 290 through conduit 291 as described before. This pressure forces the valve body 327 upward against the resistance of the spring 287, until the body 327 contacts the lower edge of the spring-retainer cap 328. In this position, the port 330 in housing 326 is indexed with the groove 331 in the valve body. Oil can now flow through the reciprocable check-valve 332 (shown in the closed position) into chamber 333, through crossholes 334, and into the circular groove 331 in the valve body 327, to charge the conduits 273 and 274 and force the master piston 270 downward into the operating position.

The lower end of the screw 335 limits the outward travel of the check-valve 332. Spring 336 keeps the check-valve closed when the unit is not in operation, so that the system will not drain.

It will be noted that the chamber 333 extends upward beyond the crossholes 334, so that any air bubbles traveling past the check-valve 332 can rise to the top and be forced between the threads of the stop-screw 335 and the valve body 327 by the high pressure in the signal circuit when the system is in operation. The minute passageway by which the air can escape will not be large enough to allow any significant quantity of oil to pass.

When the source of pressure in the line 291 has been cut off and opened to drain by the action of the solenoid valve or valves 276 in FIG. 1, spring 287 forces the valve body 327 downward against the end of the chamber 290 in the housing 326, as shown in FIG. 3. This position permits the groove 337 in the body 327 to line up with the port 330, allowing oil to flow upward past groove 337 into the spring-chamber 338 and out of the hole 340 in the cap 328 and to drain back to the crankcase 41. The amount of oil to escape is equal to that displaced by the master piston 270 and slave piston 37 when they are retracted upward and out of the way when the engine is converted back to a power producer.

Features of the master piston 270 connection with the injector rocker arm 171 are also shown in more detail in FIG. 2. Since the motion of the master piston is linear, and that of the contact point with the rocker arm 171 is an arc of a circle, it is preferable to have a toggle-link 341 operating against a ball-socket 342 in the piston 270 and against another ball-socket 343 at the lower end. The socket 343 is shown in the top of the injector rocker arm adjusting-screw 301, as this screw transmits the force created by the upward movement of the pushrod 171a directly into the toggle-link 341 through the ball-socket 343, and does not place any additional strain on the rocker arm 171. The link 341 is held in the master piston 270 by a conventional retaining-ring 344 (shown in cross-section) with enough clearance around the groove 345 to allow for angular movement of the pin 34. The spring 272a is of the hairpin-type and retained by the screw and washer 346 to the housing 326. The only function of this spring, as described previously for FIG. 1, is to retract the piston 270 and link-pin 341 away from the contact point in the socket 343 in the adjusting-screw 301, when the engine is operating as a power producer.

The slave piston 37a in FIG. 2 is shown in cross-section in FIGS. 4 and 5. The operation of the piston 37a, spring 40, and adjusting-screw 297 with locking-nut 303 and O-ring seal 347 is the same as that described previously for FIG. 1. However, the constructional details of the piston 37a should be outlined more fully. The piston 37a is hollow, with the relatively stiff spring 40 encased inside. The spring is held by a retainer-plate 348, shown in full in FIG. 4, extending far enough through slots 350 in opposite sides of the piston 37a to rest on a conventional retaining-ring 351 (shown in cross-section in FIGS. 2 and 5), extending from the housing 326. One side of the housing 326 has a slot 352 in which a projection 353 of the retainer-plate 348 is guided so that the retainer-plate 248 cannot rotate. In turn, the retainer-plate fits in the slots 350 in the piston, with a minimum working clearance to prevent the slave piston 37a from rotating and interfering with the exhaust rocker arm 32.

For operation on an engine with dual exhaust valves 30 opened by a crosshead 300, guided in a bore 354, the slave piston 37a is slotted at its lower end to straddle the exhaust rocker arm 32 with legs 355. These legs contact the hardened surface 356 of the crosshead 300 and do not interfere with the movement of the exhaust rocker arm 32 in any way.

As installed on an engine, the adjusting-screw 297 would be at a higher elevation than any other point in the hydraulic engine-braking system, for each particular engine cylinder. Therefore, with the screw removed and the solenoid valves 276 energized to introduce a flow of oil under engine lube-oil pressure into the signal circuit 273, 274, the system can be easily bled of all air at the time of installation on an engine.

*Summary of operation of devices of Figs. 1 and 2*

Having in mind the purpose of my invention is to provide an automatic system for converting the internal combustion engine in a vehicle into a powerful braking force, I shall review briefly the operation of the devices of FIGS. 1 and 2, as applied to a four-cycle diesel engine of the Cumins type, using fuel injectors of the type shown in my Patent 2,997,993. With an engine of this type, as above described, or any other engine (e.g., General Motors diesel) where the pressure for injection directly through an injector opening into the combustion chamber is created mechanically in a pumping unit located in the cylinder head, it is advantageous to use the mechanical motion of the injector-actuating means to effect the opening of the exhaust valve or other valve in the cylinder to blow down the compressed air, when the piston is near the top of its compression stroke.

Assuming the vehicle is in gear, so that momentum of the vehicle is being applied through the transmission to rotate the engine, and the vehicle is to be brought to a stop or slowed down in traffic, or is descending a hill, a substantial braking effect is added automatically when the driver places his foot on the brake-pedal pad 73 and moves it the slight distance necessary to allow the contacts in the switch 307 to close.

Closing of the contacts in switch 307 will energize the solenoid 276, which will introduce lube-oil under pressure through the check-valve 280 and the control-valve 282 to move the master piston 270 downward into contact with the injector rocker arm 171, so that when the rocker arm is moved up by the injector-plunger actuating means 171a on the start of the injection cycle a hydraulic force created by the upward movement of the master piston 270 forces downward the slave piston 37 (37a, FIG. 2), causing its rod 38 to open the exhaust valve 30 independently of the normal exhaust valve opening under the influence of the exhaust rocker arm 32 (crosshead 300, FIG. 2), to blow down the cylinder 20 when its piston 27 is near the end of its compression stroke. The check-valve 280 serves to confine the liquid column between the master piston 270 and the slave piston 37, when the piston 270 is working, whereas between working cycles of the piston 270 the normal lubricating oil pressure in the conduit 278 overcomes the spring in the check-valve 280 and replenishes any fluid lost during the working cycle of the pistons 270 and 37. So long as the r.p.m. of the engine is high enough to allow the governor 306 to hold switch 304 closed, the blow down in cylinder 20 will occur on every compression cycle. The result is that the engine will operate as an air compressor. When the switch 304 opens, the slave piston 37 (37a, FIG. 2) will cease to operate, restoring the engine immediately to its normal operation.

The selective switch or control 310 permits the vehicle operator a range of compression braking to fit the need. For example, when the control 310 is in the full line position 317 (FIG. 1) the maximum compression braking effect from all six cylinders will be produced. Assuming the vehicle equipped with a six-cylinder engine is descending a hill and this full compression gives more retarding effect than is desired, the driver can select the middle position for the control 310, which will cut down the compression effect to that resulting from four cylinders. If this still is more than needed, he can move the control 310 to the left-hand position 321 and utilize the compression retarding effort from only two cylinders. The driver may find just the opposite use for the device in that, when he first brings the compression braking effect into operation, the control 310 may be in the 321 position, giving the results of a two-cylinder compressor. Then, if he needs more, he can turn the control to increase it to take in four or six cylinders.

The net result of having my invention, as above described, incorporated in a vehicle is that, whenever the vehicle is to be brought to a stop or slowed down in traffic or is descending a hill, the engine will provide a powerful additional braking force. The reason is twofold: First, shutting off the fuel line by means of the throttle lever 26 will rob the engine of any fuel, so no power is developed as the engine rotates. (This also accounts for the increased mileage obtained by my fuel system. See my Patent 2,997,993.) Second, opening of valve 30, when the piston 27 is near the end of its compression stroke, will convert the engine into an air compressor, thereby imposing a substantial braking effect on the drive wheels 23 of the vehicle. Tests of a vehicle so equipped have given a braking effect far exceeding anything so far known.

These tests mentioned earlier, and other tests, show that for most load and road conditions the driver will not find it necessary to use the wheel brakes when descending inclined roadways. The braking effect in most cases is approximately equal to the power output of the engine required to climb a like incline, with a like load, in the same gear. This means that the driver will need to use the wheel brakes mainly at the end of a deceleration, to bring the vehicle to a complete stop, or when a sudden emergency stop is required.

One reason that, for over thirty years, workers in the art have been striving to obtain a practical means for converting an engine into a compressor for braking is that the engine has its radiator and cooling system ready to dissipate the heat generated when the engine is being used

17 as a source of power or as an energy absorbing device. Other forms of vehicle retardants require bulky and expensive independent cooling systems. The present invention makes this unnecessary.

The practicality of my device is important, for only slight changes are made in the upper portion of the existing engine and the few added parts add very little additional height to the engine. Furthermore, they can be applied as an accessory in any competent repair shop, making the invention applicable to the many thousands of Cummins engines now in use. The practicality of the device is further demonstrated by the fact that the driver has no additional levers to actuate, for everything is automatic and the desired additional braking results, first, when the driver removes his foot from the throttle pedal and, second, when he initiates movement of the foot brake-pedal. It is estimated that in an hour of driving the driver will become accustomed to the additional braking effort at his command and will learn that only in the last portion of stopping the vehicle, or in a sudden emergency stop, will it be necessary to use the brakes on the vehicle wheels.

The economics of this minimized use of the brakes means (a) less frequent relining of brakes, (b) less lay-up time for brake repairs, (c) less driver fatigue, and (d) an end to runaway trucks with loss of life, equipment, and cargo.

*Actuation by cam means added to engine cam shaft (FIGS. 6, 7)*

In FIGS. 6 and 7, I show the master piston 270 adapted to be operated directly off a third cam-lobe 357, added to the camshaft 205 of an engine which would need only two cam-lobes, intake 358 and exhaust 360, per cylinder, for normal operation as a power producer. This construction would require the housing 269a for the piston 270 and plunger 271 to be secured directly to the crankcase or engine-block 361 of the engine, by the cap 362 and bolts 363. A seal 364 would also be needed for hydraulic tightness. The function of the piston 270, plunger 271, and spring 272 would be identical to that described previously for FIG. 1, except that the plunger 271 now acts as a tappet by riding on the cam-lobe 357, rather than by actuation due to the upward movement of the injector rocker arm 171. No further description of the operation of this modification is needed, as it is substantially like the devices of FIGS. 1 and 2.

*Hydraulic actuation of injector plunger hold-down for mechanical injection type compression ignition engine (FIG. 8)*

In FIG. 8, I show the necessary additions to the hydraulic circuit described in FIG. 1, to make my engine braking system adaptable to the Cummins PT fuel system with no change in the standard injector. I do this by adding an additional control-valve, check-valve, and piston to enable the injector plunger 170 to be held seated to shut off the fuel-metering port 169 during the time the engine is actuating as a compressor.

It is necessary, with the PT fuel system, to hold the plunger 170 seated, because the fuel cannot be completely shut off at the pump when coasting or braking, due mainly to the need for plunger lubrication at all times. Therefore, to prevent the plunger from sticking in its housing 34 when braking with the fuel shut off, I hold the plunger seated. In FIG. 8, I show the controls arranged to hold the plunger seated when braking only, but it would be possible to add some additional circuitry and have the plunger held down whenever the foot was removed from the pedal 26 (see FIG. 16).

Whenever an engine of this type is acting as a compressor, the solenoid valve 276 is energized by the electrical controls, previously described in connection with FIG. 1, and lubricating oil flows from conduit 275, around the plunger 285, and into conduits 277, 278, and 291.

18

Pressure in conduit 291 acts against the end of the control-valve 282a, now shown combining the control functions of the compression braking circuit with the plunger hold-down circuit. Oil for the braking cycle can then flow past check-valve 280, through conduit 281, control-valve 282a and conduit 283 into the signal circuit 273, 274, as previously described. In a similar manner, oil can now flow past the check-valve 365, through conduit 366, ports 367 and 368 in the control-valve 282a, and into the conduit 370 leading to the plunger hold-down cylinder 371, now shown combined in the housing 36.

The hold-down piston 372 shown in FIGS. 8, 9, and 10 straddles the injector rocker arm 171, never coming into contact with it, and when forced down acts on the top surface of the plunger-spring retainer 373. When the engine is acting as a power producer, the "weak" spring 374 in FIG. 8, and 374a in FIG. 9, similar to spring 272 in FIG. 1 and 272a in FIG. 2, retracts the piston 372 up and away from the spring-retainer 373. The guide-pin 375 screwed in housing 326 and running in the groove 376 (shown dotted) prevents the piston 372 from turning and rubbing against the rocker arm 171.

It is not necessary for the oil pressure alone to be great enough to force the injector plunger 170 down and seal off the fuel supply port 169. The injector rocker arm will push the plunger down during the normal injection cycle and the piston 372 can follow down the plunger-spring retainer 373 with only the resistance of spring 374 or 374a to be overcome.

When the plunger 170 is held seated against the end 377 of the injector-plunger housing 34 by the hold-down piston 372, the closure of the check-valve 365 prevents the piston from lifting again. Thus the rocker arm 171 will continue to oscillate but will not move the plunger 170 up and down. It may take several injection cycles for the hold-down piston 372 to firmly seat the plunger, but the actual time required to do this would be extremely short. Also, there would be no shock-loading to the injection mechanism, which might harm the standard injection system. Any oil lost through leakage will be made up during the normal injection cycle, when the load on the hold-down piston is momentarily relieved and the lube-oil pressure in conduit 278 will be greater than the pressure in conduit 370 and chamber 371.

To convert the engine into a power producer again, the plunger hold-down circuit is bled in a manner very similar to that described for bleeding the excess oil out of the chambers 296 and 298. Cutting off the electric current to the solenoid-valve 276 causes the plunger 285 to be moved so that the conduit 277 can index with the bleed-conduit 286. Spring 287, acting on the control-valve 282a, pushes the valve inward and indexes port 368 with port 378, allowing enough oil to be bled into the crankcase 41, through conduits 395 and 113, to permit retraction of the hold-down piston into the housing 36 or 326. The injector-plunger spring 200 will do most of the work of pushing the oil out of chamber 371, and the spring 374 or 374a will effect the retraction away from the upper position of the retainer 373.

*Operation of the device of FIGS. 8 and 9*

This device, in basic operation, parallels that of the device shown in FIGS 1 and 2, except that here, where the device is applied to the Cummins-type engine with a PT fuel fuel system, there is provision for hydraulically holding the injector plunger 170 seated, to seal off the fuel-metering port 169, whenever the engine is acting as a compressor. This is necessary to accomplish a fuel shut-off on this type of fuel system and maintain the fuel in status quo.

Closing of the contacts in switch 307 will energize the solenoid 276, which will introduce lubricating oil under pressure through the check-valve 365 and control-valve 282a, at the same time that lubricating oil under engine oil pressure is flowing past 280 and control-valve 282a.

This lubricating oil under engine oil pressure may not be or may be employed to push down the plunger 170. Its primary function is to hold the plunger 170 seated after the injector rocker arm 171 has done the work of seating the plunger. The lubricating oil pressure in the chamber 371 first moves the piston 372 downward into contact with the top of the injector plunger spring-retainer 373 (FIG. 9), in a ready position to follow the plunger 170 when its rocker arm 171 depresses it. The column of fluid is held between the check-valve 365 and the piston 372 and thereby locks down the plunger 170 until the control-valve 282a is actuated to bleed the hydraulic circuits and the plunger resumes its normal reciprocation.

The holding down of the injector plunger 170, with the metering orifice 169 closed off, accomplishes several benefits: First, it stops passage of any fuel to the engine, so a fuel saving is realized. Second, stoppage of the fuel prevents the engine from delivering any power and, therefore, more of a braking effect is derived from the friction losses. Third, by stopping the fuel at the metering orifice, the fuel supply is held in status quo, ready to feed to the engine the instant the coasting stops or the r.p.m. of the engine drops to where the control switch 304 opens and restores the engine to normal operation. Fourth, by stopipng the plunger 170, wear is suspended on these parts and their life is extended. Fifth, the problems are solved which arise from actuating the plunger 170 when no fuel is passing through the ports around the plunger. These problems are well known in this art and include sticking plungers from lack of lubrication, overheating from lack of circulation of fuel, etc.

The economics of the closing of the injector metering orifice and holding down the plunger 170 mean substantial savings on fuel and longer life for the injector mechanism.

I shall now describe how my invention can be adapted to other types of diesel engines, as well as to spark-ignition engines. In doing this, I do not intend to exclude from coverage by the appended claims other engines to which my invetion is applicable.

*Four-cycle diesel—Solid fuel injection engine with hydraulic mechanism to open exhaust valve—Using a cam-actuated plunger added to engine (FIGS. 11, 12)*

The several elements combined to accomplish my invention are shown diagrammatically in FIG 11, where one cylinder 20 of a four-cycle internal combustion engine 21 is shown with a crankshaft 22, connected to the driving wheels 23 by the drive-shaft 24 and the transmission and clutch 25.

Each cylinder 20 has its piston 27 and suitable valves, such as 28 and 30, each with its respective rocker arm, 31 and 32, to open and close it at the proper time, as the camshaft (not shown) determines. 34 denotes the fuel feeding means, as this is a compresiscn ignition engine. 35 denotes a fuel shut-off valve interposed between the fuel pump (not shown) and the injector 34.

At 36, I have shown one form of valve opening means to open the exhaust valve 30 when the piston 27 is near the end of its compresison stroke. In this case it comprises a piston 37 with a plunger-rod 38 and return spring 40. Fluid to energize the piston 37 may be drawn from the sump in the engine crankcase 41 through conduit 42, filter 43, conduit 44, to the gear pump 45 which maintains it under pressure in the conduits 46, 47, 48, 50, and 51. A spring-loaded check or by-pass valve 52 regulates the pressure of the fluid, and a similar check-valve 53, with a spring, is set for the pressure necessary to assure a ready supply of fluid in the conduit 54, the plunger chamber 55 above the plunger 56, and the chamber 57 in the valve-opening means.

The plunger 56 is moved through its full stroke by the cam 58 on an auxiliary camshaft 33. In FIG. 12, I show further detials of the plunger 56, including the pinion 60 with teeth long enough, axially, to maintain engagement with the rack 61 connected to its actuating-plunger 62. The spring 63 normally retains the plunger 62 in the right hand end of the housing 64 against stop-screw 65. In this position, the rack 61 holds the plunger 56 with its milled grooves 66, 67 lined up respectively with the conduits 50, 51 so that as the plunger 56 rises on each rotation of the cam 58, the fluid in chamber 55 will escape through the grooves 66 and 67 and no fluid movement will occur in the conduit 54 or chamber 57.

When the rack 61 is in the position shown in FIGS. 11 and 12, with the grooves 66 and 67 rotated out of alignment with the conduits 50 and 51, there is no escape for the fluid in the chamber 55 and the plunger 56 will move the column of fluid in the chamber 55 into the conduit 54 and actuate the plunger 37 to open the valve 30 at the predetermined desired instant, to blow down the cylinder 20. So long as the rack 61 remains to the left, each stroke of the plunger 56 will cause a corresponding movement of the plunger 37 and an opening of the valve 30.

The battery 68 on the vehicle is provided with a generator 70 having its usual cut-out mechanism 71, whereby the cut-out switch 72 will be closed whenever the generator r.p.m. is above a predetermined minimum, and will be open whenever the r.p.m. is below this predetermined minimum. I make use of this cut-out switch 72 in my invention to restore the engine to normal operation when its r.p.m. drops down to the idling range, which is in the range in which the cut-out switch 72 will be open. When the vehicle has slowed down to this speed, the vital need for the auxiliary braking produced by my invention will have ceased.

As noted earlier, in place of using the automatic cut-out on the generator to open the switch 72, any speed-responsive mechanism or other mechanism, such as the governor 306 of FIG. 1 or FIG. 1b, which will close the switch 72, or its equivalent in the case of a hydraulic, pneumatic, or mechanical-control mechanism, when the engine speed is above a predetermined minimum, and will open the switch 72 or equivalent control mechanism when the engine speed is below said minimum, will be useful in accomplishing my invention.

The novel combination by which my invention is achieved therefore includes the connection between the fuel-control pedal (throttle) 26, the fuel shut-off valve 35, the valve-opening means 36, with the other parts previously described. This connection in FIG. 11 with a four-cycle diesel using a solid injection type of fuel system to accomplish compression braking includes the electrical circuit under control of the foot throttle 26 and the brake pedal 73.

The foot throttle 26 is shown fully retracted, which is the position needed for it to activate the positive fuel shut-off mechanism 35. The fuel shut-off is effected by the closing of contacts 74 and 75 of the switch, which may be on the rod 76 or in any other position convenient to actuation by the rods or levers connected to the foot throttle 26. The circuit shown is from ground to lead 77, through the pedal 26, rod 76, to contact 75. Contact 74 is on lead 78, thence through manual shut-off switch 80, lead 81, to the coil 82 on the solenoid which when energized, moves the ram-valve member 83 to close the fuel line 84, 85 so that the fuel is positively shut off and is retained in line 84 ready to flow immediately to the engine injector 34 without any lag when the spring 86 opens the valve 35 upon separation of the contacts 74, 75. The circuit to the solenoid 82 is completed through leads 87, 88 and the cut-off switch 72, either to the battery 68 or to the generator 70. The fuel shut-off valve 35, in some injection systems, may be part of the latter, as in the case of FIG. 25, and available to be connected into my system. The manual switch 80 is for testing the relative effectiveness of the fuel shut-off, and when switch 97 is also opened my compression braking system is rendered inoperative.

The other part of my control system is actuated by movement of the brake-pedal 73 (or by other, manually controlled, means) and, as shown in FIG. 11, includes two switches 90, 91 which are designed to close their contacts when the pedal-lever 92 moves away from the movable actuator pins 93 of the switches.

Reverting for a moment to the fuel shut-off valve 35, I provide the switch 91 as a safety measure in the circuit to the solenoid 82, so that if, for some mechanical or other reason, the foot throttle 26 does not come back far enough to engage the contacts 74, 75, then upon movement of the brake pedal lever 92 the contacts within the switch 91 will close and will actuate the fuel shut-off valve 35.

I shall now explain the other part of my control system which preferably, but not necessarily, is actuated by movement of the brake-pedal 73 and lever 92. This is preferred because the natural movement of a truck driver when a stop or deceleration is called for is to apply the brake, so by connecting my control system for securing the compression braking to the brake pedal, he will secure its advantage without having to learn any new movements or operations.

The first movement of the brake pedal 73 and lever 92 causes the contacts in the switch 90 to close, which completes the circuit from ground through leads 94, 95, 96, switch 97, leads 98, 100, to solenoid coil 101 and back through leads 102, 103, 88, cut-out switch 72, to the generator 70 or to the battery 68. This effects a movement of the armature 104 to the left, as shown in FIG. 11, so the two plunger portions 105, 106 have uncovered the port 107 from the conduit 47 and have covered the port 108 into the bleed-conduit 110. In this position, the fluid under pressure in the conduit 47 flows through into the conduit 111 into the chamber 69 and moves the actuating plunger 62 and its connected rack 61 (FIG. 12) to the left, for the purpose already described. So long as the contacts of switch 90 are closed, the plunger 56 will open and close and valve 30 in the engine cylinder on each complete cycle of the engine. If the contacts in switch 90 are closed and the r.p.m. of the generator 70 (or other speed responsive means) drops to the point where the cut-out switch 72 opens, the solenoid 101 will be de-energized and the spring 112 will move the valve-plunger portions 105, 106 to the right. This will cut off the fluid in conduit 47 from conduit 111 and the spring 63 under plunger 62 will move it and the rack 61 to the right, forcing the fluid back through the conduit 111 into port 108 and conduit 110 and into the return line 113 to the crankcase sump 41.

*Summary of operation of FIGS. 11 and 12*

When the driver desires to retard forward movement of the vehicle, he places his foot on the brake pedal 73 and moves it the slight distance necessary to allow the contacts in the switch 90 to close. Normally, the driver will have let the throttle pedal 26 come back to closed position but if, for some reason, it does not do so, the switch 91 will close its contacts and effect a closure of the fuel-valve 35, shutting off the supply of fuel to the engine.

Closing of the contacts in switch 90 will energize the solenoid 101, which will introduce fluid under pressure to move the plunger 62 to move the rack 61 to rotate the cam-reciprocated plunger 56 into the position shown in FIGS. 11 and 12, so the fluid in the chamber 55 will be forced through conduit 54 and move the ram 37 to open the valve 30 to blow down the cylinder 20 when its piston 27 is near the end of its compression stroke. So long as the r.p.m. of the generator 70 is high enough to hold the cut-out switch 72 closed, the blow down in cylinder 20 will occur on every compression cycle. The result is that the engine will operate as an air compressor, especially as the flow of fuel has been cut off by the valve 35. When the switch 72 opens, the valve opening ram 37 will cease to operate and the fuel valve 35 will open, restoring the engine immediately to its normal operation.

The switches 80 and 97 will be found useful in testing the effectiveness of my braking system in its several respects. By opening both switches, the vehicle braking will be done in the conventional manner, with the engine offering slight assistance. By running with the switch 80 closed and the switch 97 open, a test can be made of the effect of shutting off the fuel, both in braking and on fuel economy when coasting. By running with the switch 80 open and the switch 97 closed, a test can be made of the effect on the braking by converting the engine into an air compressor. By running with both switches closed, the full effect of my improved braking system can be tested. These switches will be useful in making the tests commonly made each day by the driver or the maintenance crew, before the vehicle takes to the road.

*Four-cycle—carbureted—spark ignition engine with hydraulic mechanism to open exhaust valve—using a cam-actuated plunger added to engine (FIG. 13)*

In FIG. 13, I show my braking system applied to a carbureted spark-ignition engine. Most of the parts are like those in FIG. 11, and the same reference numerals are used whenever possible. The difference comes in the way of shutting off the fuel, so to shorten this description only those parts will be referred to.

The carburetor 120, with a flange 121 to receive an air cleaner (not shown), is mounted on the manifold 122 with the throttle butterfly shown diagrammatically at 123, connected by the linkage 124, 125 to the throttle pedal 26 and rod 76. Between the butterfly-valve 123 and the engine inlet-valve 28, I provide a second air-inlet 126 into the manifold at 127, adapted to be closed or opened by a butterfly-valve 128. This butterfly-valve 128 is adapted to make a leak-tight fit when closed and to provide the sole source of air to the engine when the latter is converted into an air compressor. It is through this air inlet 126 that the engine draws the air to compress, so it can function to brake the speed of the vehicle.

A solenoid 82, with a rod 83 and return spring 86, opens and closes the butterfly-valve 128 under control of the circuit which actuates the fuel shut-off valve 35 in the device of FIG. 11.

In place of the fuel-injection nozzle 34 of the diesel device of FIG. 11, the device of FIG. 13 has the spark-plug 130.

Throughout this specification, wherever the butterfly-valve is used it is understood that other forms of valves may be substituted.

*Summary of operation of carbureted spark-ignition engine (FIG. 13)*

The net effect of my invention, as applied to the carbureted spark-ignition engine, is to convert the engine into an air compressor, which it does in a novel manner. An air compressor must have air in the cylinder on the compression stroke. This enters at 126 when the butterfly-valve 128 is open. To avoid fuel loss and to deprive the engine of any fuel so it could subtract from the braking effect, the carburetor butterfly 123 is kept closed.

When the driver wants to stop or slow down the vehicle, he permits the foot throttle 26 to come to the full off position. This engages contacts 74, 75 and, if the engine speed is sufficient to have switch 72 closed, it will energize solenoid 82 and the butterfly-valve 128 will open. Next, the driver will move the brake lever 92 enough to close the contacts in switch 90 and this will activate the mechanism which will open the engine exhaust-valve 30 when the piston 27 is near top dead-center on its compression stroke. This release of pressure, combined with the opening of the manifold by the butterfly-valve 128, so each intake stroke of the piston can draw in a full charge of air, is a new functioning of the parts of a carbureted spark-ignition engine.

As in the case of the device of FIG. 11, the engine is converted into an air compressor and will exert a substantial braking effect on the wheels of the vehicle until its speed is reduced to where the switch 72 opens. When the switch 72 opens, butterfly-valve 128 closes, plunger 37 is inactivated, and the engine becomes again a carbureted spark-ignition engine.

*Four-cycle diesel—Solid fuel injection engine with hydraulic mechanism to open exhaust valve—Using pressure from high-pressure pump and distribution system to open valve (FIG. 14).*

In FIG. 14, I have shown my invention applied to a four-cycle diesel having solid fuel injection. It differs from the device in FIG. 11 in that, in FIG. 14, the force to operate the valve opening plunger 37 is created by a continuously running high pressure pump 131 and entry of the fluid under high pressure to the plunger 37 is controlled by the timer or distributor 132, whereas in FIG. 11 the force is created by the cam-timed and operated plunger 56. Like reference numerals are used where possible.

Referring now to FIG. 14, one form of a satisfactory distributor or timer is shown at 132, where the distributor-head 133 is shown with a lapped fit against the inside face 134 of the distributor housing 135. A shaft 136 is rotated at cam-shaft speed and runs in a suitable bearing 137 in the housing 135. The distributor-head 133 is secured to the shaft 136. The washer 138 is splined to the shaft 136 and can slide on it. A suitable thrust-bearing provides an anti-friction support of the washer 138 against the back wall 140 of the housing 135. Thus, by means of a very light spring 141, a gentle pressure can be applied to hold the distributor-head 133 against the face 134. A suitable oil-seal 142 confines the fluid within the distributor body.

In FIG. 15, I show in elevation the face of the distributor-head, where the section lines indicate that, in FIG. 14, the section of the head 133 is taken on the lines XIV—XIV of FIG. 15. The high pressure fluid which will actuate the plunger 37 enters the distributor through conduit 143 in the center of the housing 135. It then passes into the center-bore 144 of the head 133, then it passes into the radial-bore 145, and out through the axial-bore 146, which is shown lined up with conduit 54 to the plunger 37. At this instant, the plunger 37 is holding open the valve 30. The ports in the lapped faces will be shaped to give the correct interval for the high pressure fluid to do its work in lifting the valve 30.

In closing the valve 30, the return flow of the fluid will be permitted immediately after the other ports are closed. In FIG. 15, the return-feed port in the distributor-head 133 is shown at 147, which connects to the ring like duct 148 in the housing 135. The port connects to radial duct 151 and to the return duct 152 which leads the fluid back to the crankcase sump 41. When the distributor is not being used to open and close the valve 30, it is important that the distributor-head 133 rotate with as light a pressure as possible against the face 134. When high-pressure fluid enters through conduit 143, it is important that this pressure of the head 133 against the face 134 be increased. One way of doing this is to have a simultaneous or slightly advanced introduction of fluid under pressure behind the head 133, through duct 153. Because the area of the back of the head 133 is so much greater than the area of the ports 144, 146, 147, and 148 in the head, much less fluid pressure is required in the duct 153, to fill the housing and hold the head 133 tight against the face 134 than is needed in the duct 143 to open the valve 30.

Also, in FIG. 14, I show one form of mechanism for supplying the fluid under two different pressures. The fluid pump 45 and pressure regulator 52 have been described and are parts of such engines. As used in FIG. 14, the fluid under the relatively low pressure needed for engine lubrication is adequate to provide the pressure to back up the distributor 133. I provide the ducts 154 and 155 to carry the fluid to the distributor housing 135 whenever the solenoid valve 156 is in the position shown in FIG. 14. When the solenoid is de-energized, its spring 157 moves the valve 156 to connect the duct 155 to the return line 152, through duct 158.

The fluid under high pressure for actuation of the valve-plunger 37 is produced in the pump 131, with its pressure-regulator by-pass valve 160. Leaving the pump, the fluid passes through ducts 161 and 162 directly to the duct 143 in the distributor, when the solenoid valve 163 is in the position shown in FIG. 14, which is the position for operating valve 30. When the valve 163 moves upwardly upon de-energization of the solenoid 164, the fluid under high pressure will be shunted from duct 161 into duct 165.

This completes the description of the distributor way of opening the valve 30 to obtain the desired braking effect. Since the net effect and operation as a brake is similar to the device of FIG. 11, the description of its operation will not be repeated.

*Compression ignition engine—Mechanical injection type with mechanical actuation—Using injector actuating means to open valve and with mechanical plunger hold-down (FIG. 16)*

In FIG. 16, I show how my invention is embodied in a four-cycle (Cummins type) compression ignition engine, to convert the engine automatically into a compression brake and to cut off the flow of fuel into the cylinders by mechanical means. I shall described it in connection with the same throttle pedal 26 and brake pedal 73 actuating controls as are already explained in FIGS. 11, 13 and 14, above. The principal differences in the Cummins installation (FIG. 16) from FIG. 8 lie in the mechanical means for holding seated the injector plungers and for opening each valve 30 to blow down its cylinder when the piston 27 is near the end of its compression stroke.

To achieve, with a minimum of parts, the mechanical actuation of the valve 30 to blow down the cylinder 29, I again provide a one-way locking connection between the injector rocker 171 and the exhaust-valve rocker 32 alongside it. In FIGS. 16, 17, and 18, one form of mechanical one-way locking connection is shown. On the Cummins engine, the rockers 32 and 171 are paired so the injector rockers 171 of each adjacent pair of cylinders face each other, and there is room between them for a mounting frame 172 (FIG. 17) to support the mechanical locking connection means.

The actual locking of the exhaust-valve rocker 32 to the injector rocker 171 is effected by a pin 173 slidably mounted in a bore 174 in the hub of the rocker arm 171. The pin 173 is shown in FIG. 17 in locking position, stopped by the sidewall 175 of the slot 176 in the rocker 32. In dotted lines, the pin 173 is shown retracted by the spring 177, so the rockers 32 and 171 are free to move independently. In FIG. 18, the slot 176 is shown in the position it would be in when the exhaust-valve push-rod 32a had moved the exhaust rocker arm 32 to open the exhaust-valve 30. Even if the pin 173 is in the full line position of FIG. 17, this movement of the exhaust rocker 32 does not move the injector rocker 171. Conversely, if the pin 173 is in the full line position of FIG. 17 and the injector rocker 171 is rocked by its push-rod, then the pin 173 will engage the bottom 178 of the slot 176 and will carry the exhaust rocker 32 with it, opening the exhaust valve 30 far enough to effect a blow-down of the cylinder.

Movement of the locking pin 173 into locking position is effected by the hydraulic ram 180 mounted in the bore 181 of the frame 172. Fluid under pressure is introduced through conduit 182, under control of the solenoid actuated valve 183. The pin 173 has a smooth, rounded end 184 to provide a sliding connection with the end face 185 of the ram 180, because the pin 173 moves across the face 185 each time the injector rocker arm 171 oscillates.

Movement of the locking pin into locking position is effected automatically whenever the vehicle driver moves the brake pedal lever 73 and closes the contacts in switch 90. This energizes the solenoid 186 and moves the valve 187 to connect the fluid under pressure in conduit 50 to conduit 182. When the contacts in switch 90 open, the valve 187 will drop and the fluid in conduit 182 will flow into the conduit 188 and 113 back to the engine sump 41. Other features and advantages of the system will be explained as soon as the injector plunger seating mechanism is described.

The foregoing has described a mechanical means of effecting an opening of the exhaust valve by movement of the injector push rod 171a and rocker 171. Other forms of mechanical connections may be used to get an equivalent result in my system. Another form of mechanism is shown in FIGS. 22 and 26.

In FIGS. 16, 19, and 20, I show a mechanical way of stopping any fuel from being injected into the cylinder 20, by holding the injector plunger 170 seated, which shuts off the flow of fuel from the metering orifice 169 into the plunger chamber. If it were not for closing the metering orifice as explained, the injector would continue, on its indexing cycle, to meter small amounts of fuel into the plunger chamber and be injected from there into the cylinder 20 when coasting.

This closing of the metering orifice is effected whenever the engine is rotating above the speed at which the switch 72 will open, and the driver (a) removes his foot from the foot-throttle pedal 26 to close the contacts 74, 75 or (b) if these contacts remain open for one reason or another, when he moves the brake pedal 73 and closes the contacts in switch 91. This energizes the solenoid 190, which lifts the valve 191 into the position shown in FIG. 16, so that fluid under pressure flows from conduits 50 and 192 into conduit 193 and to the twin-ram cylinder 194. This forces the rams 195 outwardly against the resistance of the springs 196. The outer end of each ram has a cam-face 197 which engages the slotted sleeve 198 secured to the top of the injector plunger 170. When the cam 197 is in the position shown in FIG. 19, the injector plunger 170 is held seated. The injector plunger was brought into this seated position by the engine cam-shaft, the push rod 171a, and the rocker arm 171, so that the only work the cam or wedge 197 has to do is to hold the plunger 170 depressed. When the solenoid 190 is de-energized, the valve 191 drops and connects the conduit 193 to the return conduits 188 and 113, and the springs 196 return the rams 195 to the dotted line position in FIG. 19. This allows the spring 200 to lift the injector plunger 170.

As shown in FIGS. 19 and 20, the injector rocker-arm 171 extends through the slot in the sleeve 198 into position over the end of the plunger 170. The upper edge 201 of the sleeve 198 is spaced above the top 202 of the rocker by a distance greater than the distance the end of the rocker 171 must move, so that when the cam 197 has the injector held down the rocker 171 is free to move through its full range of movement.

When the injector plunger 170 is held down, it is advisable to hold the rocker 171 and its push rod 171a in its socket so that, while the vehicle is coasting and the solenoid 186 has not been energized to convert the engine into an air compressor, the push rod will seal off any oil leaks from the lubrication hole in the rocker arm. This prevents the loss of lubrication in the rocker arm assembly which could occur if the push rod were not held snugly against the oil hole in its socket in the rocker arm. Another advantage is that it prevents rattling of the parts and a harmful beating of each push rod in its upper and lower sockets.

This is accomplished by the spring 203 in the tappet member 204 above the engine camshaft 205. In FIG. 21, the parts are shown as they would be with the engine in normal operation. When coasting, with the fuel shut off according to my invention, the lower bell-shaped end 206 of the push rod 171a would be lifted above its socket in the tappet by the height of the cam lift. The spring 203 holds the tappet in contact with the cam at all times.

Provision of the spring 203 to hold the injector rocker arm 171 at the farthest point to which the camshaft can cause it to oscillate produces an interesting and important new functioning of the parts which can be explained in this way: When the injector rocker arm 171 and the exhaust rocker arm 32 are at their respective retracted positions, the bore 174 in the injector rocker arm 171 for the locking pin 173 is aligned with the end 178 of the slot 176 in the exhaust rocker arm. In other words, the locking pin 173 would slide into the slot 176 and any movement of the injector rocker arm would move the exhaust rocker arm as if they were one piece. In the actual operation of a multi-cylinder engine, it is not likely that more than one of the locking-pins 173 would move into an adjacent slot 176 when the two rocker arms are in their non-working positions, when the valve 187 is opened. By holding the injector rocker arms 171 in their full oscillated position, during coasting and immediately prior to energization of the rams 180 on the locking pins 173, I assure that each locking pin will engage in the slot 176 while its associated exhaust-valve rocker arm 32 is oscillating. Once the pin 173 is engaged in the slot 176, the spring 203 will be overcome and the lifting of the push rod 171a will oscillate both the exhaust-valve rocker arm 32 and the injector plunger rocker arm 171.

*Summary of operation of FIG. 16*

When the driver of this vehicle, moving along the highway or on a hill, finds it necessary to slow down or to stop, he will remove his foot from the throttle 26, which will close the contacts 74, 75 and energize the solenoid 190. This introduces fluid under pressure to the ram 195, causing the wedge or cam 197 to try to move in over its injector plunger rod 170 with its split cap 198.

When the rocker arm 171 next oscillates, thereby lowering the cap 198, the wedge will move in over the cap and will hold down the injector plunger 170 with the metering orifice 169 closing off.

If the driving condition next calls for the driver to discontinue coasting, he merely presses the foot throttle, which opens the contacts 74, 75 which de-energizes the solenoid 190, causing the valve 191 to move downwardly, aligning the conduit 193 with the conduits 188 and 113. This removes the pressure from the rams 195 and the spring 196 moves the wedge 197 back from the cap 198 and the injector plunger 170 returns to normal operation.

If, after removing his foot from the foot throttle pedal 26, the driver finds he needs to slow the vehicle faster than is being done by having the fuel shut off in the manner above described, then he actuates the brake-lever 92 far enough to close the contacts in switch 90, but not far enough to apply the wheel brakes. This energizes the solenoid 186, which introduces fluid under pressure to the rams 180, which puts each locking pin 173 under pressure to move into slot 176 in the adjacent exhaust-valve rocker arm 32. This locks the injector rocker arm 171 to the exhaust-valve rocker arm 32 with a one-way connection, so that the push rod 32a for the exhaust rocker arm 32 can move the arm 32 without also moving the injector rocker arm 171, but the push rod 171a for the injector rocker cannot move the arm 171 without also moving the exhaust-valve rocker arm 32. The net result is that the exhaust valve 30 will open during its normal period under the influence of its cam, and the exhaust valve will open again momentarily under the influence of the injector-plunger cam, while the injector plunger 170 remains closed by the wedge 197. This effects the conversion of the engine into a compressor.

With the engine converted into a compressor and applying the braking effort to the drive wheels through the transmission, when the driver has slowed the vehicle so the engine r.p.m. is below the speed required to maintain switch 72 closed, the engine is automatically restored to its normal functioning. The solenoid 186 is de-energized, the fluid pressure behind rams 180 is released, the spring 177 retracts the locking pin from the slot 176 in the exhaust-valve rocker 32 and the injector plunger 170 is released as the spring 196 removes the wedge from on top of the split sleeve 198. If the vehicle is rolling fast enough so switch 72 remains closed, thereby holding the injector-plunger 170 seated, even when the driver removes his foot from the brake pedal (this is the coasting, fuel-off condition), the driver can convert the engine back into a power source by simply pressing the foot throttle pedal which opens the contacts 74, 75 and releases the pressure on the plunger 195, allowing the spring 196 to withdraw the wedge 197 so the injector plunger 170 can resume operation.

*Alternative actuator for injector plunger (FIG. 22)*

A modification of the actuating mechanism for use on the Cummins or General Motors type engines is shown in FIG. 22, where the one-way locking of the rocker arms 32 and 171, to effect the opening of the exhaust-valve when the piston 27 is near the end of the compression stroke, is replaced by a hydraulic actuator with a ram 37 and rod 38, which acts on top of the rocker arm 32. The source of fluid pressure for the ram is from a high-pressure pump 131 as shown in FIG. 14. On FIG. 22, I have omitted showing the distributor 132 which goes in between the conduits 54 and 143, as this is detailed on FIG. 14. Also, I have not repeated a description of the ram-actuating system, shown in FIG. 11, which may be adapted to actuate the ram 37 in FIG. 22.

On FIG. 22, a hydraulic hold-down is also provided for the injector-plunger 170, in place of the mechanical hold-down shown in FIGS. 16, 19 and 20. This is accomplished by providing a cylindrical bore 210 in the injector housing 34, to receive the piston 211 secured to the plunger 170. Fluid under high pressure is introduced above the piston 211 through the conduit 193 by the solenoid-actuated valve 190, 191. Instead of having the ram 195 move the wedge 197 to hold down the plunger 170, as in FIGS. 16 and 19, I attach the ram directly to the plunger 170 in the form of a piston 211, as shown in FIG. 22. Its operation and function is the same in both cases.

*All controls on accelerator pedal*

Also on FIG. 22, I have shown an alternative location for the switch 90, which mounts it on the foot accelerator-pedal 26 instead of being adjacent to and actuated by the foot brake lever 92. This puts the two-stage control on one pedal; first the fuel shut-off when the pedal 26 comes up, and second the conversion of the engine into a compressor when the foot comes off the pedal 26.

When the driver puts his foot on the pedal 26, the switch-pin 93 is depressed, and this opens the switch contacts in the circuit 94, 96, 97, 88, 72, 68. When the driver lifts his foot off the pedal 26 far enough to release the pin 93, the effect will be to convert the engine into a compressor, as already described, if the switch 72 is closed. One advantage of this is to give a "dead-man" control, effective when the driver's foot comes away from the pedal 26. This feature is applicable to all forms of my invention.

When the driver moves the throttle-pedal 26 to feed fuel to the engine, this opens the switch contacts 74, 75 in the circuit 77, 78, 80, 88, 72, 70, 68, and the engine operation is normal. When he lets the pedal 26 come back so contacts 74, 75 close, the effect will be to shut off the fuel (FIGS. 11, 14), or to hold down the injector-plunger 170 (FIGS. 16, 17, 18, 19), if the switch 72 is closed, as already described.

One big advantage of having the switch 93 on the accelerator pedal is that the driver can take full advantage of my invention in shifting gears, especially under conditions of a start on an upward incline with a heavy load. Beginning with the vehicle at a standstill, the operator will start up in one of the lower speeds in the transmission 25. Assuming the vehicle is heavily loaded and that the start is being made under one of the most difficult conditions, namely, climbing a hill, the operator will depress the foot-throttle 26 to bring the engine to its highest permitted r.p.m. When this speed is attained, he will release his foot from the pedal 26, which will close the contacts 74, 75, thereby shutting off the fuel (FIGS. 11, 13, 14), or it will effect a hold-down of the injector-plunger 170 (FIG. 16). Furthermore, contacts in the switch 90 will close, converting the engine into a compressor. This latter, especially, will reduce the r.p.m. of the engine in a fraction of the time otherwise required. When the r.p.m. is thus speedily reduced, the driver will find it easy to mesh the next set of transmission gears, before the vehicle has lost much of its forward momentum. The driver can make additional shifts in this manner until he has reached the highest ratio practical for the particular hill and load condition. Heretofore, a driver has had to remain content to stay in a low gear and move at a slow pace all the way to the top of the hill, simply because the engine r.p.m. would not reduce fast enough to make an upshift possible before the vehicle lost its forward momentum. The economics of this advantage are (a) less time on the road; (b) less fuel consumed; and (c) less engine wear.

*Auxiliary blow-down valves (FIGS. 23 and 24)*

The embodiments of my invention so far described make use of one of the existing valves 30 in the engine, and show means to open this valve momentarily when the piston 27 is near the end of its compression stroke. In FIGS. 23 and 24, I show an alternative, which includes adding a separate valve 220 which covers a port 221 connected to a manifold 222 leading to atmosphere. Actuation of the valve 220 can be by the ram 37 of FIGS. 11, 13, 14, and 22, or by other suitable mechanism connected to the timing device of the engine.

FIG. 24 provides an outward-opening valve 230 seated in a port 231 in the combustion chamber, which may be used to effect the blow-down as the piston 27 nears the end of its compression stroke. This will be described in connection with FIG. 14 because the ram 232 is equivalent to the ram 37 of FIG. 14, in that it has fluid under pressure fed to it by the distributor 132 through conduit 54. The spring 233 returns the ram 232 after each stroke. A wedge-shaped cam 234 acts on the roller 235 on the valve-stem 236 and normally holds the valve 230 closed on its seat 231. An advantage of the outwardly-opening valve 230 is that less pressure is required on the ram 232 to move it than would be required to move the valve 30 in the devices like FIGS. 11, 14 and 16, and the compression pressure acts to open valve 230 when the cam 234 is moved away from the roller 235.

*Fuel shut-off applied to Bosch-type fuel pump (FIG. 25)*

I now show my invention applied to shut off the fuel in a fuel injection system of the so-called Bosch-type, where the fuel throttling is done by means of a small butterfly-valve 240 in the intake manifold 241. The conversion of the engine to a compressor can be done in any of the ways shown in FIGS. 11, 14, 16, or equivalents. The portion of the system now being described is only the fuel shut-off means.

When the butterfly is closed, the pressure in the manifold drops and this draws the diaphragm 242 and the attached rack 243 of the fuel pump 239 to the right, compressing the return-spring 244 and closing off the fuel. When the driver opens the butterfly-valve 240, the pressure rise in the manifold allows the spring 244 to move the rack 243 to the left, feeding fuel to the engine. Because my system converts the engine into an air-compressor, it is necessary that a full supply of air enter the cylinders to be compressed, which in turn necessitates opening of the aforementioned butterfly-valve 240. As just explained, this would open the throttle and feed fuel to the engine, were it not for the following mechanism:

The foot throttle pedal 26 has a lost motion link 245 at the end of rod 76, so that in my system, when the driver moves the brake pedal lever 92 to close the contact in switch 90 (see FIG. 11) to convert the engine into a compressor, the fluid under pressure released into the conduit 246 by the solenoid valve like 163 in FIG. 14 will cause the rams 247 and 248 to move. Ram 247 moves its rod 250 to the right, as shown in FIG. 25, to push the lever 251 clockwise, against the resistance of the return-spring 252. This opens the butterfly-valve 240 mounted on a shaft secured to the lever 251. Simultaneously, ram 248 moves its rod 253 and connected lever 254, pivoted at 255, against the stop 256 on the fuel-pump rack 243, to prevent the spring 244 from moving the rack 243 to the left to feed fuel to the engine, as it otherwise would do, since the butterfly 240 is open. The instant the switch 90 opens its contacts, or the cut-out switch 72 opens, the solenoid 164 will release the valve 163 and the rams 247 and 248 will be retracted by their respective springs 257, 258. This will restore lever 251 to control by the spring 252 and by the throttle rod 76, and unless the foot-throttle 26 is depressed, the butterfly valve 240 will close. It will also restore the fuel pump rack 243 to control by its connected diaphragm 242, as the hold-lever 254 is moved away from the stop 256.

*Alternative valve opening means (FIG. 26)*

In FIG. 26, I show another form of valve-actuator to open the valve 30, or its equivalent, each time the piston 27 is near the end of its compression stroke. This would replace the ram 37 of FIGS. 1, 2, 8, 11, 13, 14, 22 and 23, or the one-way mechanical connection between the exhaust-valve rocker arm 32 and injector rocker arm 171 of FIG. 16, or the plunger 232 and valve 230 of FIG. 24. One advantage of the valve-actuator of FIG. 26 is that it can be incorporated in many existing engines without great difficulty.

The engine camshaft 205 actuates the tappet 260, above which is the push-rod for the valve 30. I show the push-rod divided into two parts, 261 and 262, and slidably mounted in a sleeve 263 which may be rigidly secured to the side of the engine block under the valve cover. The sleeve has an annular recess 264 connected to an inlet-duct 265, to which the fluid-duct 54 is secured. The recess 264 is located to embrace the division point of the push-rod parts 261 and 262 and to extend above this point of juncture by at least the distance the rod part 262 is to be lifted away from the lower rod part 261. To facilitate this lifting, I cut a slot 268 in the meeting face of the parts 261, 262.

To prevent the rod part 262 from moving upwardly too far, a stop-pin 266 is placed in the slot 267. Operation of this form of valve-opening means is as follows: The conduit 54 of FIG. 11 is connected to the recess 264. When the plunger 56 rises, it forces fluid through the conduit 54 into the recess 264, and this forces the rod part 262 upwardly, thereby opening the valve 30. When the plunger 56 falls, the fluid flows from between the parts 261, 262 and they seat on each other. Before the next cycle, the engine-cam 205 will have lifted the tappet 260 and valve push-rod 261, 262 for the regular opening of the exhaust-valve 30, as if it were a solid push-rod.

While no reference has been made in the foregoing to the down-stroke of the piston 27, after the valve 30 opens near the end of the compression-stroke, it will be appreciated that since this down-stroke is the power stroke when the engine is under normal operation it can become a suction stroke on certain engines when my brake system is operating as shown in FIGS. 11, 13, 14, and 22. From the instant the valve 30 closes, after the blow-down, the suction will be effective to lend its part in slowing down the engine, thereby giving in each cylinder an alternate vacuum-pump, air-compressor effect. On the Cummins-type engine of FIGS. 1, 8, and 16, the cam which actuates the rocker arm 171 holds down the injector 170 until near the bottom of the power stroke, so the suction effect would not be realized on that engine. On other diesel engines, where movement caused by the injector-cam is relied on, in my system, to open the valve for the blow-down, whether the suction effect will be obtained will depend on the injector-cam timing.

As used in the specification and in the claims, the words "injector plunger for feeding fuel into each cylinder," or their equivalents, are intended to cover not only the mechanical injection of the Cummins and General Motors type engine but also, in certain circumstances, the type of fuel injection apparatus such as the Bosch or similar type having separate fuel pumps where the source of injection pressure is created remote from the cylinder head. Also, in this connection, as in the claims, "cam means" or "camshaft" or their equivalents are intended to cover the main cams of the engine or any auxiliary cams, such as in the Bosch-type fuel system.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim

1. A braking system for an internal combustion engine having a crankshaft and a plurality of cylinders, each with a piston connected to the crankshaft,
   fuel delivery means, air inlet means, and exhaust valve means for each cylinder,
   a camshaft synchronized with said crankshaft, and
   cam means actuated by said camshaft for actuating said exhaust valve means in each cylinder during both the normal operataion of said engine as a power producer and during braking periods employing said braking system,
   said system comprising
   auxiliary valve actuating means in synchronism with said engine crankshaft for actuating each said exhaust valve means at or near the end of the compression stroke of the piston in its cylinder without interfering with actuation of said exhaust valve by said cam means, and
   control means for bringing said auxiliary valve actuating means into operation for braking periods of any needed duration, when usually the amount of fuel delivered to the engine is being reduced below usual power requirements,
   whereby said engine during said braking periods becomes a power absorber rather than performing its normal function as a power producer.

2. The device of claim 1, in which there is means rendered operative by said control means for inactivating said fuel delivery means during said braking periods.

3. The braking system of claim 1, in which said auxiliary valve actuation means includes
   an injection actuating mechanism for said engine and
   an auxiliary connection means actuated by said injection actuating mechanism.

4. The braking system of claim 1, in which said auxiliary valve actuating means includes a one-way connection between an exhaust valve rocker and an injector rocker arm,
   whereby the latter, when oscillated, will actuate said valve rocker arm and said valve rocker arm, when oscillated, will not actuate said injector rocker arm.

5. The device of claim 1 in which said auxiliary valve actuating means includes for each cylinder a master piston in a bore, means for reciprocating said master piston in its bore, a slave piston in another bore hydraulically connected to and moved in its bore by said master piston, and means operatively connecting said slave piston to said engine exhaust valve for actuation of the latter when said control means is set to produce the braking condition in said engine.

6. The braking system of claim 1, in which said auxiliary valve actuating means includes a multiple piece valve pushrod mounted in a housing having a fluid chamber surrounding the abutting pieces and
    means to introduce fluid under pressure between said pieces
    whereby one part will move relative to the other and will open said valve.

7. The braking system of claim 1, in which said fuel delivery means includes a carburetor for generating a fuel-air mixture, and
    an air inlet valve between said carburetor and combustion chambers in said cylinders, said air inlet valve being opened by said control means whenever said engine is converted into a compressor.

8. A braking system for an internal combustion engine having a crankshaft and a plurality of cylinders, each with a piston connected to the crankshaft,
    fuel delivery means, air inlet means, and exhaust valve means for each cylinder,
    camshaft means synchronized with said crankshaft, and
    a plurality of cam means actuated by said camshaft means, said cam means including one said cam means for each said cylinder for normal actuation of the exhaust valve means in that said cylinder during both the normal operation of said engine as a power producer and during braking periods employing said braking system,
    said system comprising
    auxiliary valve actuating means, for each said cylinder actuated by a different said cam means from the cam means that actuates the exhaust valve means for that cylinder for additionally actuating said exhaust valve means at or near the end of the compression stroke of the piston in its cylinder without interfering with actuation of said exhaust valve, and
    control means for bringing said auxiliary valve actuating means into operation for braking periods of any needed duration, when usually the amount of fuel delivered to the engine is being reduced below usual power requirements,
    whereby said engine during said braking periods becomes a power absorber rather than performing its normal function as a power producer.

9. The braking system of claim 8 wherein said different cam means is an exhaust valve cam means for a different said cylinder.

10. The braking system of claim 8 wherein said different cam means also actuates a said air inlet means for a different said cylinder.

11. The braking system of claim 8 wherein said different cam means also actuates the fuel delivery means for the same said cylinder only.

12. The braking system of claim 11 wherein said camshaft means comprises two camshafts, one primarily for said exhaust valve means and the other primarily for said fuel delivery means.

13. The device of claim 8 in which there is means rendered operative by said control means for inactivating said fuel delivery means during said braking periods.

14. The device of claim 8 in which said superimposed auxiliary valve actuating means includes for each cylinder a master piston moved in a bore by said different cam means, a slave piston hydraulically connected to and moved in another bore by said master piston, and means operatively connecting said slave piston to said exhaust valve means for actuation of said exhaust valve means when said control means is set to produce the braking condition in said engine.

15. In a braking system for an internal combustion engine having a crankshaft, a plurality of cylinders, each with a piston connected to the crankshaft,
    fuel delivery means, air inlet means, and exhaust valve means for each cylinder,
    a camshaft in synchronism with said crankshaft, and
    cam means for each said cylinder operated by said camshaft to actuate said exhaust valve means for each cylinder in every exhaust cycle of said engine,
    the combination therewith of an auxiliary valve actuating means for each cylinder moved by one of said cam means other than the one actuating the exhaust valve means for that cylinder to actuate that said exhaust valve means in that said cylinder to open that said exhaust valve means at or near the end of the compression stroke of the piston in that said cylinder without interfering with actuation of that said exhaust valve by said cam means which actuates it in each exhaust cycle, and
    control means to bring said superimposed auxiliary valve actuating means into operation for braking periods of any needed duration, when usually the amount of fuel deliverd to the engine is being reduced below usual power requirements,
    whereby said engine during said braking periods becomes a power absorber rather than performing its normal function as a power producer.

16. In a braking system for an internal combustion engine having a crankshaft and a plurality of cylinders, each with a piston connected to the crankshaft,
    fuel delivery means, air inlet valve means, and exhaust valve means for each cylinder,
    a camshaft in synchronism with said crankshaft,
    inlet valve cam means to actuate said inlet valve means for each said cylinder, and exhaust valve cam means to actuate said exhaust valve means for each cylinder in each exhaust cycle of said engine,
    the combination therewith of:
    auxiliary valve actuating means for each cylinder moved by one of said cam means other than the exhaust valve cam means for that cylinder for additional actuation of said exhaust valve means in that cylinder to open that said exhaust valve means at or near the end of the compression stroke of the piston in that said cylinder without interfering with actuation of said exhaust valve in said exhaust cycle by said first memtioned exhaust valve cam means, and
    control means to bring said superimposed auxiliary valve actuating means into operation for braking periods of any needed duration, when usually the amount of fuel delivered to the engine is being reduced below usual power requirements,
    whereby said engine during said braking periods becomes a power absorber rather than performing its normal function as a power producer.

17. In a braking system for an internal combustion engine having a crankshaft, and a plurality of cylinders, each with a piston connected to the crankshaft,
    fuel delivery means, air inlet means, and exhaust valve means for each cylinder,
    cam means in synchronism with said crankshaft for actuating said fuel delivery means of each said cylinder and second cam means also in synchronism with said crankshaft for actuating said exhaust valve means of said cylinder in every exhaust cycle of said engine,
    the combination therewith of auxiliary valve actuating means for each cylinder moved by one of said cam means other than the one actuating the exhaust valve means for that cylinder to actuate that said exhaust valve means in that said cylinder to open that said exhaust valve means at or near the end of the compression stroke of the piston in that said cylinder without interfering with actuation of that said exhaust valve by said second cam means which actuates it in each cycle, and control means to bring said superimposed auxiliary valve actuating means into operation for braking periods of any needed duration, when usually the amount of fuel delivered to the engine is being reduced below usual power requirements, whereby said engine during said braking periods becomes a power absorber rather than performing its normal function as a power producer.

18. A braking control system for a multi-cylinder internal combustion engine which has an air inlet into each cylinder,
an injector plunger for feeding fuel into each cylinder,
an exhaust valve in each cylinder,
cam means with plunger actuating means and valve actuating means moved thereby,
a piston reciprocable in each cylinder,
a crankshaft connected to each said piston,
means for connecting said crankshaft to a load,
a speed-responsive control means synchronized with said crankshaft which is in the ready state when the engine is rotating above a predetermined r.p.m. and is incapable of actuation when the engine is rotating below a predetermined r.p.m., and
a throttle lever for regulating the flow of fuel to said engine,
said braking control system including means for opening one of the valves in each cylinder independently of its said valve actuating means,
means synchronized with said crankshaft and including a said cam means for timing and prolonging said opening to occur when its piston is near the end of its compression stroke and to remain open long enough for its cylinder to blow-down,
whereby when said control means is in ready state and said means for opening is actuated, said engine is converted into a compressor during the time when usually the amount of fuel delivered to the engine is being reduced below usual power requirements.

19. The combination of claim 18 in which the means for opening one of the valves in each cylinder independently of its said valve actuating means includes means actuated by the injector plunger actuating means.

20. The combination of claim 18, in which the means for opening one of the valves in each cylinder independently of its said valve actuating means is one of the existing cams on the camshaft other than the cam which normally opens said valve.

21. A fuel shut-off system for a multi-cylinder internal combustion engine which has an air inlet and fuel supply orifices into each cylinder, a piston reciprocable in each cylinder, and a crankshaft connected to each said piston, including in combination:
an injector plunger for feeding fuel into each cylinder,
an exhaust valve in each cylinder,
cam means with plunger and valve actuating means moved thereby, and
means under operator control for holding said injector plungers seated under predetermined engine operating conditions.

22. The device of claim 21, in which said engine is connected to equipment to be driven by said engine in normal operation and in which said engine absorbs power from said equipment when the latter is driving said engine, whereby the seating of said injector plungers seals off the fuel supply orifices and prevents the wastage of fuel and the buildup of carbon deposits in the fuel supply orifices.

23. A braking and fuel control system for equipment powered by a multi-cylinder internal combustion engine which has an air inlet into each cylinder, an injector plunger for feeding fuel into each cylinder, an exhaust valve in each cylinder, a camshaft with plunger and valve actuating means moved thereby, a piston reciprocable in each cylinder, a crankshaft connected to each said piston, means for connecting said crankshaft to said equipment, a control means, and a throttle lever for regulating the flow of fuel to said engine, said braking and fuel control system including
means for holding closed the fuel injection plunger when said control means is actuated,
means for opening one of the valves in each cylinder independently of and in addition to its normal opening cycle,
means for timing said opening to occur when its piston is near the end of its compression stroke, and
means for causing said valve to remain open long enough for its cylinder to blow down,
whereby when said control means is actuated, said engine is converted into a compressor with the fuel shut off but ready to feed instantly upon inactivation of said control means.

24. The device of claim 23, in which said control means is in the ready state when the engine is rotating above a predetermined r.p.m. and is incapable of actuation when the engine is rotating below a predetermined r.p.m.

25. A fuel control system for equipment powered by a multi-cylinder internal combustion engine which has an air inlet into each cylinder, an injector plunger reciprocated for injecting fuel into each cylinder, means to feed fuel to said plungers for instant availability to them, an exhaust valve in each cylinder, a camshaft with plunger actuating means and valve actuating means moved thereby, a piston reciprocable in each cylinder, a crankshaft connected to each said piston, means for connecting said crankshaft to said equipment, a speed responsive control means which is in ready state when said engine speed is above a predetermined r.p.m. and is incapable of actuation when the engine speed is below a predetermined r.p.m., and a throttle lever for regulating the flow of fuel to said injector plungers;
said fuel control system including in combination therewith:
means for holding closed the fuel injector plungers when said control means is in ready state and for reactivating said plungers when the engine speed drops below said predetermined r.p.m.,
whereby when said control means is in ready state, said fuel is shut off but ready to feed instantly when said engine speed drops below said predetermined r.p.m.

26. In a braking system for an internal combustion engine having a crankshaft and plurality of cylinders, each with a piston connected to the crankshaft,
fuel delivery means, air inlet means, and exhaust valve means for each said cylinder, and
a camshaft with cam means to actuate said exhaust means for each cylinder in the normal operation of said engine as a power producer,
the combination therewith of:
an additional cam on said camshaft for each cylinder, said cam being in addition to the above normal cam means for normal engine operation,
auxiliary valve actuating means for each cylinder moved by one of said additional cams for actuating said exhaust valve means in its cylinder to open said exhaust valve means at or near the end of the compression stroke of the piston in said cylinder without interfering with actuation of said exhaust valve by its said cam means, and
control means to bring said auxiliary valve actuating means into operation for braking periods of any needed duration, when usually the amount of fuel delivered to the engine is being reduced below usual power requirements,
whereby said engine during said braking periods becomes a power absorber rather than performing its normal function as a power producer.

27. In a braking system for a four-cycle, internal combustion engine having a plurality of cylinders, each with a piston, fuel injection means, and inlet and exhaust valves,
the combination of
an auxiliary valve lifting means adapted to open said exhaust valve, and
means actuated by said fuel injection means on a cylinder to actuate said valve lifting means for that cylinder when its piston is near the end of its compression stroke,
whereby said engine is converted into a braking force by the compression of the gases during the normal compression stroke and by their release near the end of said stroke.

28. In a braking system for an internal combustion compression ignition engine having a plurality of cylinders, each with a piston, fuel injection means, air inlet means and exhaust valve means,
the combination of
an auxiliary valve lifting means adapted to open said exhaust valve, and
means common to said fuel injection means on a cylinder for actuating said auxiliary valve lifting means for that cylinder when its piston is near the end of its compression stroke,
whereby said engine is converted into a braking force by the compression of the gases during the normal compression stroke and by their release near the end of said stroke.

29. The device of claim 28 in which there is fuel shut off means rendered operative to inactivate said fuel injection means when said engine is converted into a braking force.

30. The device of claim 29 in which said fuel shut off means and said means for actuating said auxiliary valve lifting means are actuated by a single control member.

31. The combination of claim 29, in which said fuel shut off means includes an injector plunger, normal actuating means for said plunger, and a holding member which engages said plunger to hold it down and bridges around the end of the normal actuating means for said plunger, so that said actuating means is free to move even when said injector plunger is being held closed.

32. The combination of claim 31, in which the means for opening one of the valves in each cylinder independently of its normal opening cycle is actuated by the injector plunger actuating means.

33. The combination of claim 29, wherein said fuel injection means includes a plunger and said shut off means includes means for moving said plunger including a retractable holding member engageable with said plunger to prevent movement of said plunger.

34. The combination of claim 33, wherein said fuel injection means includes an oscillating plunger-actuating mechanism,
said retractable holding member acting upon said plunger to hold it closed while permitting the normal oscillation of said plunger-actuating mechanism.

35. A braking system for an internal combustion engine having a crankshaft and a plurality of cylinders, each with a piston connected to the crankshaft,
fuel delivery means, air inlet means, and exhaust valve means for each cylinder,
a camshaft synchronized with said crankshaft,
cam means actuated by said camshaft for actuating said exhaust valve means in each cylinder during the normal operation of said engine as a power producer,
said system comprising
fluid energized auxiliary valve actuating means for actuating each said exhaust valve means at or near the end of the compression stroke of the piston in its cylinder without interfering with actuation of said exhaust valve by said cam means,
a source of fluid under pressure, means for converting said fluid source periodically to each of said auxiliary valve actuating means, said means including a distributing apparatus synchronized to said camshaft rotation,
and control means for bringing said fluid energized auxiliary valve actuating means into operation for braking periods of any needed duration, when usually the amount of fuel delivered to the engine is being reduced below usual power requirements,
whereby said engine during said braking periods becomes a power absorber rather than performing its normal function as a power producer.

36. In a braking system for engine driven vehicles, wherein a multi-cylinder internal combustion engine is arranged to alternately drive and be driven by the vehicle, and wherein each cylinder is provided with a piston, a combustion chamber, air inlet means and exhaust valve means, the combination of: a valve lifter associated with each cylinder and arranged when operated to open the exhaust valve thereof, a power source moving in synchronism with the engine and actuated at about the time when the piston in one of the cylinders is near the end of its compression stroke, a power transmitting connection between said power source and the valve lifter associated with said one cylinder, said power transmitting connection being arranged to transmit motion from the power source to the valve lifter to operate the latter when the power transmitting connection is in operative condition and the power source is actuated, means including a solenoid operatively connected to the power transmitting connection to maintain the latter in operative condition whenever the solenoid is in one position, said last mentioned means being arranged to disable the power transmitting connection when the solenoid is in the other position, said power transmitting connection when disabled being ineffective to transmit motion from the power source to the valve lifter, an electric circuit connecting the solenoid to a source of electromotive force, a switch in said electric circuit connected in series with the solenoid, said switch being movable between open and closed positions to control the movement of the solenoid from one position to the other, whereby in one position of the switch the valve lifter is actuated to open the valve and thereby relieve the combustion chamber of pressure whenever the piston arrives at a predetermined position at the end or about the end of its compression stroke to convert the engine into a brake, and whereby in the other condition of the switch the valve lifter is unresponsive to movements of the power source and permits the engine to power the vehicle.

37. In a braking system, the combination described in claim 36, in which the power transmission connection comprises a servo motor hydraulic circuit including a master piston operatively connected to the power source and a slave piston connected to the valve lifter, said hydraulic circuit including also a control valve operated by the solenoid, said control valve being arranged in one position of the solenoid to maintain the pressure in the hydraulic circuit sufficiently to effect transmission of motion from the master piston to the slave piston and in the other position of the solenoid being effective to release the pressure in the hydraulic circuit to prevent transmission of motion from the master piston to the slave piston, thereby rendering the slave piston and valve lifter unresponsive to the reciprocation of the master piston in response to the actuation of the power source.

38. In a braking system, the combination defined in claim 36 which includes also a second power source moving in synchronism with the engine and actuated at the end of the power stroke of the piston, and which includes a second power transmitting connection between the second power source and the exhaust valve arranged to open the exhaust valve upon actuation of the second power source, independently of the first motion transmitting connection.

39. In a braking system, the combination defined in claim 36, in which the switch in said electric circuit is manually controlled.

40. In a braking system, the combination defined in claim 39, in which the electric circuit includes in series the manually controlled switch, the solenoid, and a second switch, said second switch being operatively connected to the foot brake of the vehicle and arranged to be closed whenever the foot brake is depressed.

41. In a braking system, the combination defined in claim 39, in which the electric circuit includes in series the manually controlled switch, the solenoid, and another switch, said other switch being operatively connected to the accelerator of the vehicle and arranged to be closed whenever the accelerator is released.

42. A braking system for an internal combustion engine having output means and cylinder means with piston means in driving relation with said output means, fuel delivery means, air inlet means, and exhaust valve means for said cylinder means, a camshaft synchronized with said output means, and cam means actuated by said camshaft for actuating said exhaust valve means in said cylinder means during both the normal operation of said engine as a power producer and during braking periods employing said braking system, said system comprising auxiliary valve actuating means in synchronism with said output means for actuating said exhaust valve means at or near the end of the compression stroke of the piston means in its cylinder means without interfering with actuation of said exhaust valve by said cam means, and control means for bringing said auxiliary valve actuating means into operation for braking periods of any needed duration, when usually the amount of fuel delivered to the engine is being reduced below usual power requirements, whereby said engine during said braking periods becomes a power absorber rather than performing its normal function as a power producer.

43. A braking system for an internal combustion engine having a crankshaft and a plurality of cylinders, each with a piston connected to the crankshaft, fuel delivery means, air inlet means, and exhaust valve means for each cylinder, a camshaft synchronized with said crankshaft, and cam means actuated by said camshaft for actuating said exhaust valve means in each cylinder during both the normal operation of said engine as a power producer and during braking periods employing said braking system, said system comprising auxiliary valve actuating means in synchronism with said engine crankshaft for actuating the exhaust valve means of some cylinders at or near the end of the compression stroke of the piston in its cylinder without interfering with actuation of said exhaust valve by said cam means, and control means for bringing said auxiliary valve actuating means into operation for braking periods of any needed duration, when usually the amount of fuel delivered to the engine is being reduced below usual power requirements, whereby said engine during said braking periods becomes a power absorber rather than performing its normal function as a power producer.

44. The device of claim 43 in which said control means is provided with means for determining how many of said auxiliary valve actuating means are activated during said braking periods.

References Cited by the Examiner

UNITED STATES PATENTS

| | | | |
|---|---|---|---|
| 754,466 | 3/1904 | Lewis | 123—182 |
| 821,410 | 5/1906 | Hall | 123—182 |
| 1,437,738 | 12/1922 | Sargent | 123—182 |
| 2,168,232 | 8/1939 | Messinger | 192—3 |
| 2,489,068 | 11/1949 | Carlson | 123—139 |
| 2,528,983 | 11/1950 | Weiss | 192—3 |
| 2,733,696 | 2/1956 | Schneider | 123—97 |
| 2,785,668 | 3/1957 | Dehmer | 192—3 |

RICHARD B. WILKINSON, *Primary Examiner.*

DAVID J. WILLIAMOWSKY, KARL J. ALBRECHT,
*Examiners.*